(12) United States Patent
Jung et al.

(10) Patent No.: US 9,830,123 B2
(45) Date of Patent: Nov. 28, 2017

(54) METHOD FOR TRANSMITTING CONTENT WITH INTUITIVELY DISPLAYING CONTENT TRANSMISSION DIRECTION AND DEVICE USING THE SAME

(75) Inventors: Ji-su Jung, Chungcheongbuk-do (KR); Jae-uk Han, Gyeonggi-do (KR); Ju-il Eom, Gyeonggi-do (KR); Sang-jun Han, Seoul (KR); Kee-wook Na, Gyeonggi-do (KR); Seung-hwan Hong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 114 days.

(21) Appl. No.: 12/774,841

(22) Filed: May 6, 2010

(65) Prior Publication Data

US 2010/0313143 A1 Dec. 9, 2010

(30) Foreign Application Priority Data

Jun. 9, 2009 (KR) .................. 10-2009-0050851
Dec. 10, 2009 (KR) .................. 10-2009-0122693

(51) Int. Cl.
*G06F 3/14* (2006.01)
*G09G 5/00* (2006.01)
(Continued)

(52) U.S. Cl.
CPC .......... *G06F 3/1446* (2013.01); *G06F 3/0486* (2013.01); *G06F 3/04883* (2013.01); *G09G 5/006* (2013.01); *G09G 2340/145* (2013.01)

(58) Field of Classification Search
CPC ..... G06F 17/21; G06F 3/017; G06F 17/30905
(Continued)

(56) References Cited

U.S. PATENT DOCUMENTS 5,802,537 A * 9/1998 Makita ................ 715/257
2004/0203931 A1* 10/2004 Karaoguz ............. 455/457
(Continued)

FOREIGN PATENT DOCUMENTS

CN 1543598 A 11/2004
EP 1076282 7/2005 ............ G06F 3/033
(Continued)

OTHER PUBLICATIONS

Van De Sluis, B. M., et al.; Patent Application Publication No. US 2006/0146765 A1; Publication Date: Jul. 6, 2006; "System for Ad Hoc Sharing of Content Items Between . . . ;" . . .
(Continued)

*Primary Examiner* — Angie Badawi
(74) *Attorney, Agent, or Firm* — Cha & Reiter, LLC.

(57) ABSTRACT

A method for indicating a direction of content transfer intuitively and a device applying the same includes determining directions in which surrounding devices of the device are located, and a direction to which the content on a display of the device is to be moved, and transferring the content to the surrounding device located in the determined direction. Accordingly, it is possible to select a device to receive the content more easily and intuitively, and also input a command to select the device to receive the content and to transfer the content with one single manipulation.

27 Claims, 22 Drawing Sheets

(51) Int. Cl.
*G06F 3/0486* (2013.01)
*G06F 3/0488* (2013.01)

(58) Field of Classification Search
USPC .......................................................... 715/753
See application file for complete search history.

(56) References Cited

U.S. PATENT DOCUMENTS

| | | | |
|---|---|---|---|
| 2006/0136828 A1 | 6/2006 | Asano | |
| 2006/0146765 A1* | 7/2006 | Van De Sluis et al. | 370/338 |
| 2007/0146347 A1 | 6/2007 | Rosenburg | |
| 2007/0233759 A1* | 10/2007 | Tomlinson et al. | 708/200 |
| 2008/0009298 A1 | 1/2008 | Karaoguz | |
| 2009/0011772 A1 | 1/2009 | Choi et al. | |
| 2009/0309846 A1* | 12/2009 | Trachtenberg et al. | 345/173 |
| 2010/0058253 A1* | 3/2010 | Son | 715/863 |
| 2011/0063191 A1* | 3/2011 | Leung et al. | 345/1.1 |

FOREIGN PATENT DOCUMENTS

| | | | |
|---|---|---|---|
| KR | 2007-34767 | 3/2007 | H04B 1/40 |
| WO | 02/03186 A2 | 1/2002 | |
| WO | 2004/075169 A2 | 9/2004 | |

OTHER PUBLICATIONS

Tomlinson, William M, et al.; Patent Application Publication No. US 2007/0233759 A1; Publication Date: Oct. 4, 2007; "Platform for Seamless Multi-Device Interactive Digital . . . ;". . .

NiharsWorld; "How to Extend Desktop to LCD/MONITOR/TV?;" Jun. 19, 2008; Retrieved from Internet: http://www.niharsworld.com/2008/06/19/how-to-extend-desktop-to-lcdmonitortv/ [Retrieved on Dec. 5, 2011].

Intel; "Mobile Intel 915GM/GMS, 910 GML Express Chipset Family Multi-Monitor: Options for Multiple Displays;" Jan. 9, 2005; Retrieved from internet: http://www.intel.com/support/graphics/intel915gm/sb/cs-020155.htm [Retrieved on Dec. 5, 2011].

Xing, Bo, et al.; "Proximiter: Enabling Mobile Proximity-Based Content Sharing on Portable Devices;" IEEE International Conference on Pervasive Computing & Communications 2009. PERCOM 2009; Mar. 9, 2009; XP031453145.

European Search Report dated Jul. 22, 2016.
European Result of Consultation dated Mar. 15, 2017.

* cited by examiner

FIG. 2

| DIRECTION | ID |
|---|---|
| W | ID_#1 |
| N | ID_#2 |
| E | ID_#3 |
| S | ID_#4 |

METHOD FOR TRANSMITTING CONTENT WITH INTUITIVELY DISPLAYING CONTENT TRANSMISSION DIRECTION AND DEVICE USING THE SAME

CLAIM OF PRIORITY

This application claims priority from Korean Patent Application No. 10-2009-0050851, filed on Jun. 9, 2009, and Korean Patent Application No. 2009-0122693, filed on Dec. 10, 2009, in the Korean Intellectual Property Office, the disclosure of which is incorporated herein by reference in its entirety.

BACKGROUND OF THE INVENTION

1. Field of the Invention

The present invention relates to a method for transmitting content by portable devices including portable terminals, tablet computers, etc. More particularly, the present invention relates to a method for transmitting content to a target receiving device as desired by a user of a transmitting device, and a device for applying the same.

2. Description of the Related Art

Content sharing and transfer between devices has become commonplace these days, and along with this, many devices of various types have been developed to receive and store content.

However, particularly in the case of wireless transmission, an increasing problem caused by the explosive growth of such device is that there can be so many receiver devices in the proximity of reception that there is increased difficulty in selecting a desired receiver device for a user to transfer content. In other words, the user of a transmitting device has to know the target device accurately among a plurality of devices prior to starting content transfer in order to prevent the problematic situation where the content is transferred to an unintended device requiring the user inconvenience of having to delete the transferred content. In addition, there are security issues with transferring content to an unintended recipient who may not just delete the transferred content, but may use the information therein for personal gain.

SUMMARY OF THE INVENTION

Exemplary embodiments of the present invention may overcome the above-mentioned disadvantages as well as address other disadvantages and may provide advantages over the conventional art.

The present invention provides a method and apparatus for enabling more convenient and intuitive selection of a receiver device, by determining a direction in which surrounding devices are located and a direction in which content on a display is to be moved, so that the content is transferred to the surrounding device in a direction as intended.

The present invention also provides a method and apparatus for indicating intuitively a direction of a surrounding device for transferring the content, by visually displaying the transfer of the content from the direction of the surrounding device.

According to an exemplary aspect of the present invention, there is provided a method and apparatus for transferring content of a device. A method for transferring content of a particular device, the method comprising:

(a) location-determining locations at which one or more devices surround a perimeter of the particular device are located to determine directions relative from the particular device to each of the one or more surrounding devices;

(b) direction-determining to determine a particular direction to which the content on a display of the particular device is being moved; and (c) transferring the content displayed on the particular device to one of the one or more surrounding devices located in the particular direction which has been determined as a result of the direction-determining in (b).

The location-determining function preferably includes receiving information about the surrounding devices via different sides of the device, and determining the directions in which the surrounding devices are located.

The location-determining function preferably include determining a location of a first surrounding device of the surrounding devices, which transfers its own information via a first side of the particular device, to be located in a first direction; and determining a location of a second surrounding device of the surrounding devices, which transfers its own information via a second side of the particular device, to be located in a second direction.

The information of the surrounding devices are received via different sides of the device preferably by at least one of infrared communication, sound wave communication, ultrasonic communication, RF communication, wireless network communication, or WiFi communication.

The location-determining function preferably includes determining directions in which the surrounding devices are located based on information about the surrounding devices as input by a user.

The method may additionally include re-determining the directions of the surrounding devices determined in the location-determining, and updating the directions of the surrounding devices based on the result of re-determining on a periodic basis or according to need/desire.

The direction-determining function includes determining a direction to which the content is to be transferred based on a direction in which the content is moved on the display by the user, and the transferring includes transferring the content to the surrounding device located in a direction to which the content is moved.

The direction-determining function includes determining a direction in which the content is moved based on the side of a non-visible border (imaginary frame) the content is contacted with, if the content is moved by the user and contacted with an imaginary frame (non-visible border) provided inside the display.

The direction-determining function includes determining that the content is moved in the particular direction comprising a first particular direction if the content makes contact with a first side of the imaginary frame, and determining that the content is moved in a second particular direction if the content makes contact with a second side of the imaginary frame.

If the content is moved in two directions on the display by the user and there is the surrounding device only in one of the two directions, the direction-determining includes determining the one of the two directions as being the designated direction to which the content is moved.

The direction-determining function preferably includes determining a direction to move the content to, based on a direction input by the user.

The direction-determining function may include determining the direction input by the user using one of: a direction selecting item indicated on the display; and a physical direction selecting button.

The method may additionally include visibly indicating that the content is transferred to the direction in which the surrounding device is located. The visibly indication that the content is transferred to includes moving one of the content and an icon representing the content to a direction in which the surrounding device is located so that one of the content and the icon representing the content disappears outside the display of the particular device.

According to an exemplary aspect of the present invention, a side of the display, from which one of the content and the icon representing the content disappears, is the closest side to the surrounding device. The 'one of the content and the icon representing the content' disappearing from the display of the particular device appears on a display of the surrounding device, and a location at which the 'one of the content and the icon representing the content' disappears from the display of the particular device faces a location at which the 'one of the content and the icon representing the content' appears on the display of the surrounding device.

The transferring the content function starts the transference of content to the surrounding device, prior to one of the content and an icon representing the content touches an edge of the display.

The displaying includes moving the content to the direction in which the surrounding device is located until the content disappears outside of the display, and the transference of content comprises starting a transfer of a part of the content to the surrounding device which will disappear outside the display.

The method may additionally include transferring information about display status of the content on the display to the surrounding device, and the surrounding device refers to the information about display status of the content in displaying the part disappearing from the device.

The method may additionally include, for example, limiting the movement of the content within the display, if determining that the surrounding device is not located in the direction to which the content is moved.

The content is moved on the display by at least one of the user's dragging and flick manipulations.

According to one exemplary aspect of the present invention, there is provided a method for receiving content of a device, which may include location-determining to determine directions in which surrounding devices of the device are located, receiving the content from one of the surrounding devices, and visibly indicating that the content is received from a direction in which the transmitting surrounding device is located.

The visibly indicating may preferably include displaying an indication so that the content appears from a side close to the surrounding device transmitting the content, from among the sides of a display of the device.

The visibly indicating may preferably include displaying so that the content appears at a predetermined location on a display of the device.

The visibly indicating may preferably include computing a location on a side which is close to the surrounding device and at which the content starts appearing, using information about the display status of the content received from the surrounding device, and displaying the content such that the content appears at the computed location.

The visibly indicating may preferably include visibly indicating that the content is received from the direction in which the surrounding device is located, by controlling an order of illuminating light emitting diodes of the device.

According to another exemplary aspect of the present invention, there is provided a device which may include a network interface connected communicatively to surrounding devices located nearby by a network, a display to display the content, and a controller for determining directions in which the surrounding devices are located, and for determining a direction to which the content is moved on the display and transfer of the content to the direction determined via the network interface.

The network may preferably comprise, for example, a WiFi network.

According to yet another exemplary aspect of the present invention, there is provided a device which may include a network interface connected communicatively to surrounding devices located nearby a network, a transceiving unit to perform directivity-based communication with the surrounding devices, and a controller to determine directions in which the surrounding devices are located using a result of communication at the transceiving unit, and to visibly indicate that the content is being received from the direction in which the transmitting surrounding device is located when receiving the content from one of the surrounding devices via the network interface.

BRIEF DESCRIPTION OF THE DRAWINGS

The above and/or other exemplary aspects of the present invention will become more apparent by describing certain exemplary embodiments of the present invention with reference to the accompanying drawings, in which:

FIG. 2 is a view illustrating an example of direction-ID table stored in a tabletop device;

DETAILED DESCRIPTION

Figure 1:
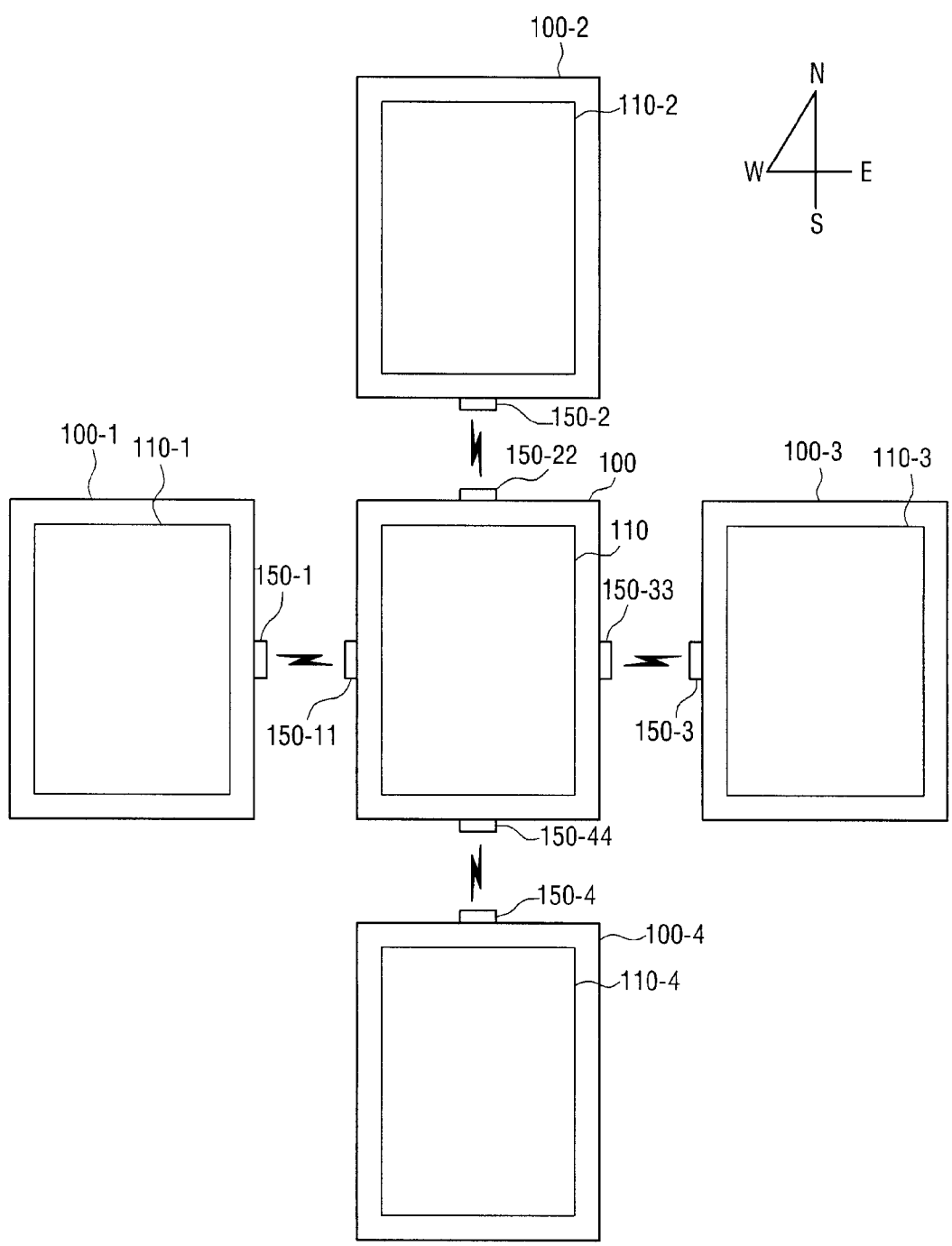
FIG. 1 is a view illustrating a method for determining a direction in which surrounding tabletop devices are located.

Certain exemplary embodiments of the present invention will now be described in greater detail with reference to the accompanying drawings. In the following description, the same drawing reference numerals are used for the same elements even in different drawings. The matters defined in the description, such as detailed construction and elements, are provided to assist in a comprehensive understanding of the invention. Thus, it is apparent to a person of ordinary skill in the art that the exemplary embodiments of the present invention can be carried out without those specifically defined matters. Also, well-known functions or constructions may not be described in detail when they would obscure appreciation of the invention by a person of ordinary skill in the art with detail about such well-known functions or constructions.

In the exemplary embodiments explained below, a method for enabling an intuitive input of a user command for content sharing among devices, and adaptive display of the content sharing process to the user input, are discussed.

Preferred Exemplary Embodiments (1) Determining a Direction in which Surrounding Tabletop Devices are Located FIG. 1 is a view illustrating an example of a method for determining a direction in which surrounding devices are located. As illustrated in FIG. 1, there is a plurality of tabletop devices (hereinafter, shortly referred to as 'TDs') 100, 100-1, 100-2, 100-3, and 100-4 that surround the device 100.

Although not explicitly illustrated in FIG. 1, the TDs (100, 100-1, 100-2, 100-3, and 100-4) may be inter-communicatively connected to each other via a network. The network may be a wired or wireless network (for instance, WiFi). Accordingly, the TDs (100, 100-1, 100-2, 100-3, and 100-4) are able to transfer and receive data to and from each other via a network and/or on a peer-to-peer level.

The TDs (100, 100-1, 100-2, 100-3, and 100-4) may each include touch screens (hereinafter, shortly referred to as 'TSs') (110, 110-1, 110-2, 110-3, and 110-4) formed on upper portions, and preferably include infrared transceiving units (hereinafter, shortly referred to as 'ITUs') (150-1 to 150-4, and 150-11 to 150-44) formed on sides thereof.

The ITUs (150-1 to 150-4, and 150-11 to 150-44) are used preferably for infrared communication among remote TDs. Specifically, the ITU (150-1 to 150-4, and 150-11 to 150-44) of one specific TD may perform infrared communication with that (150-1 to 150-4, and 150-11 to 150-44) of another remote TD facing the specific TD (i.e. line-of-sight).

By way of example, an ITU-11 (150-11) provided in a westerly direction of a TD 100 may perform infrared communication with the ITU-1 (150-1) provided in an easterly direction of TD-1 (100-1).

Meanwhile, still referring to FIG. 1, the infrared communication process includes ID exchanges among TDs. Specifically, the ITU-11 (150-11) transmits ID_0# of the TD 100 to the ITU-1 (150-1) of TD-1 (100-1), and the ITU-1 (150-1) transmits ID_#1 of TD-1 (100-1) to the ITU-11 (150-11).

The same ID exchanges by the infrared communication are also performed between the ITU-22 (150-22) and ITU-2 (150-2), between ITU-33 (150-33) and ITU-3 (150-3), and between ITU-44 (150-44) and ITU-4 (150-4), as the ITU's preferably are capable of bidirectional infrared communication.

Accordingly, the TDs (100, 100-1, 100-2, 100-3, and 100-4) know which TDs are located nearby, and in which direction those TDs are located.

The TD 100 determines the follow items 1) to 4) as follows:

1) TD-1 (100-1) is located in a westerly (W) direction, based on ID_#1 received from the ITU-1 (150-1) via the ITU-11 (150-11);

2) TD-2 (100-2) is located in a northerly (N) direction, based on ID_#2 received from the ITU-2 (150-2) via the ITU-22 (150-22);

3) TD-3 (100-3) is located in an easterly (E) direction, based on ID_#3 received from the ITU-3 (150-3) via the ITU-33 (150-33); and 4) TD-4 (100-4) is located in a southerly (S) direction, based on ID_#4 received from the ITU-4 (150-4) via the ITU-44 (150-44).

Additionally, 1) the TD-1 (100-1) determines that TD 100 is located in an easterly (E) direction, based on ID_#0 received from the ITU-11 (150-11) via the ITU-1 (150-1);

2) the TD-2 (100-2) determines that TD-2 (100-2) is located in a southerly (S) direction, based on ID_#0 received from the ITU-22 (150-22) via the ITU-2 (150-2);

3) the TD-3 (100-3) determines that TD 100 is located in a westerly (W) direction, based on ID_#0 received from the ITU-33 (150-33) via the ITU-3 (150-3); and 4) the TD-4 (100-4) determines that TD 100 is located in a northerly (N) direction, based on ID_#0 received from the ITU-44 (150-44) via the ITU-4 (150-4).

A person of ordinary skill in the art should understand and appreciate that the north, south, east and west are relative directions used for explanatory purposes.

Figure 2:
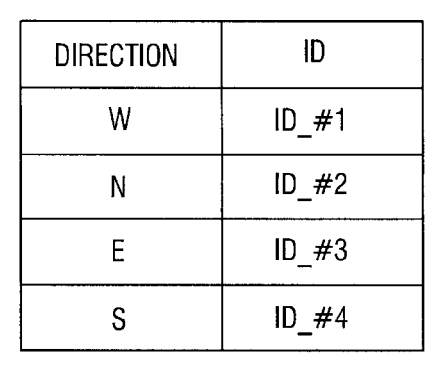

The information about the directions of the surrounding TDs is stored in a tabular form along with the IDs of the surrounding TDs. An example of direction/ID table stored in the TD 100 is illustrated in FIG. 2. Herein below, the process of transferring content will be explained with reference to the exemplary table shown in FIG. 2.

(2) Content Transfer to Surrounding TDs in Directions where Content is Dragged

FIGS. 3A to 3E illustrate a process in which an image is transferred to another TD according to a user's image dragging manipulation. For convenience of illustration, FIGS. 3A to 3E only show TD 100 located in the center, and TD-3 (100-3) located in an easterly (E) direction of the TD 100, but a person of ordinary skill in the art should appreciate that there can be many other arrangements that are within the spirit of the invention and the scope of the appended claims.

In the exemplary embodiment explained below, it is assumed that the TD 100 is a transmitting side which transfers an image "I", and TD-3 (100-3) is a receiving side which receives the image I from the TD 100.

Figure 3A:
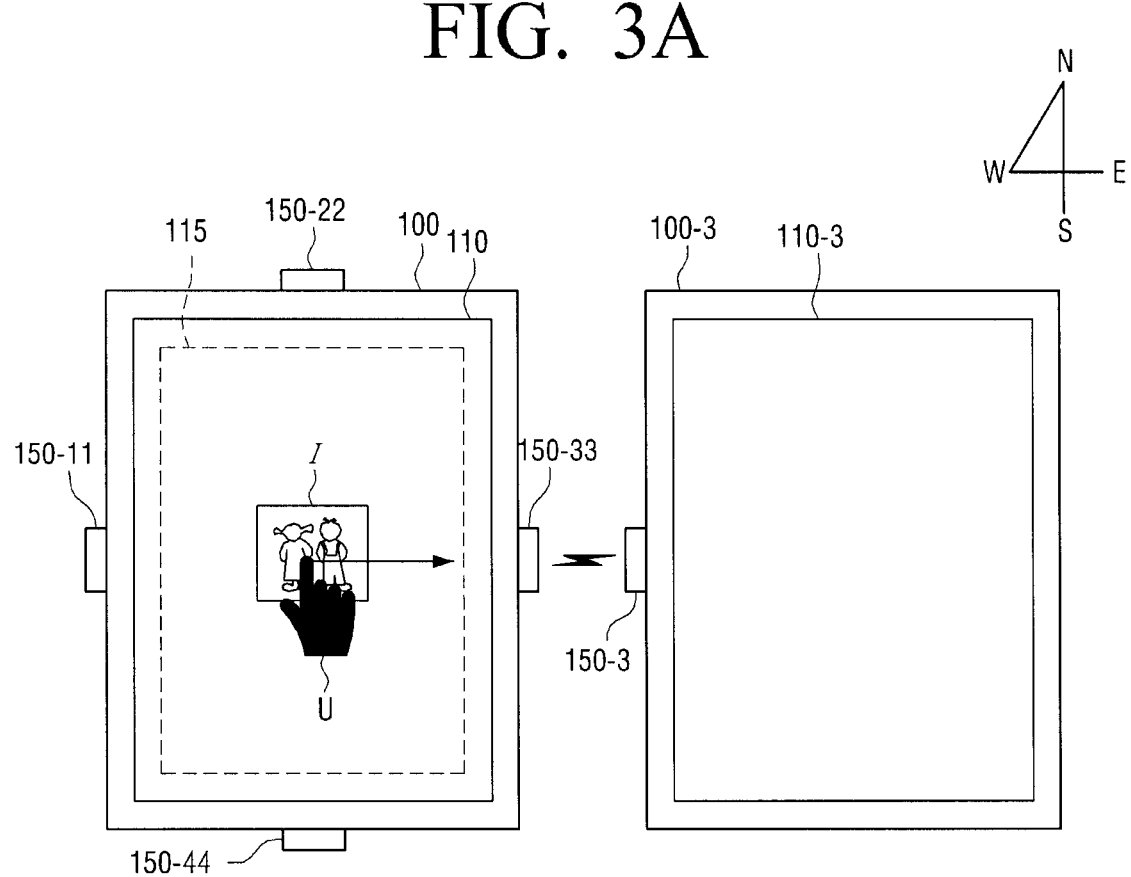
FIGS. 3A to 3E are views illustrating a process of transferring an image to a second tabletop device by an image drag manipulation of a user.

Referring now specifically to FIG. 3A, if a user "U" touches the image I displayed on the TS 110 of the TD 100, and drags the image I in an easterly direction (i.e., to where the TD-3 (100-3) is located) until the image I touches an imaginary frame 115 provided within the TS 110, the TD 100 knows the direction where the user U is aiming at based on the user's dragging. Note that the imaginary frame 115 preferably is not visibly shown on the TS 110.

It is possible to determine the direction of user's dragging by determining which side of the imaginary frame 115 the image I is brought into contact with as a result of the user's dragging.

Figure 3B:
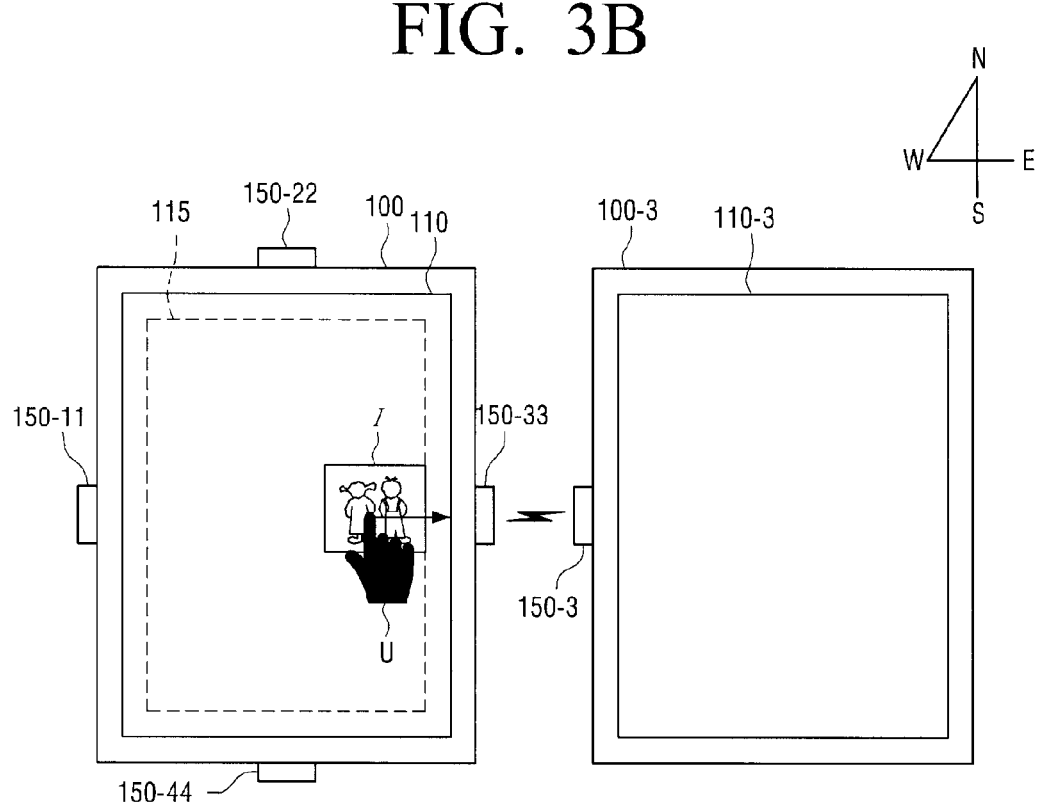

Referring now to FIG. 3B, if the image I is dragged into contact with the right-side of the imaginary frame 115 in the easterly direction, the TD 100 determines the direction of the user's dragging to be westward (W).

Accordingly, the TD 100 determines the TD located in the direction to which the user U is dragging the image I, by referring to the direction/ID table as the one exemplary illustrated in FIG. 2. In the exemplary embodiment explained herein, the direction of the user's dragging is eastward (E), and as illustrated in FIG. 2, the TD-3 (100-3) with ID_#3 is located in the east (E) direction.

Accordingly, the TD 100 starts transferring data about the image I (hereinafter, shortly referred as 'image data') dragged by the user U to the TD-3 (100-3) located in the direction of the user's dragging as portions of the image I continue to come into contact with the user screen 115.

As the user U keeps dragging the image I in the intended direction, the image data is transferred, starting from the data about the first part to disappear from the display of TS 110.

Since the TD 100 and TD-3 (100-3) are inter-communicatively connected to each other, the image data that disappears from the display of TS 110 is transferred from the TD 100 to the TD-3 (100-3) via the network.

Additionally, the TD 100 starts transferring information about the status of image on display on the TS 110 (hereinafter, shortly referred to as 'image display status information') to the TD-3 (100-3). The image display status information on the TS 110 is modulated into infrared ray at the TDI-33 (150-33) and transferred to the TDI-3 (150-3).

Figure 3C:
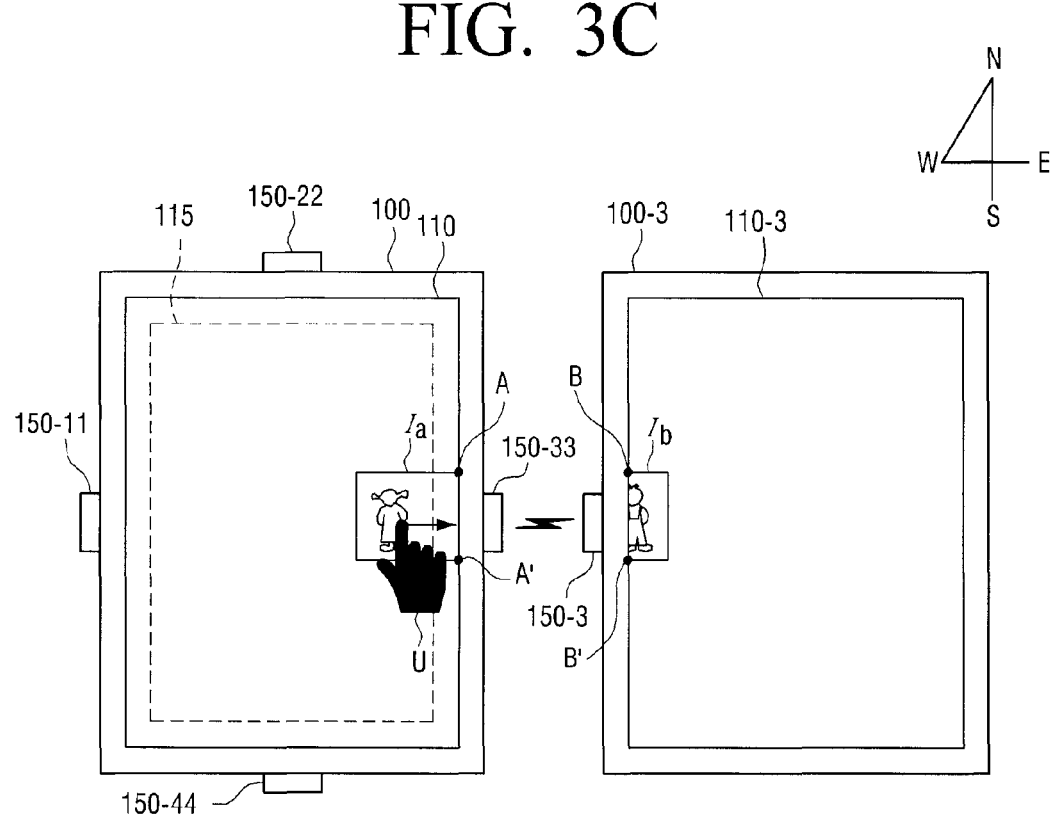

As shown in FIG. 3C, as the user U keeps dragging the image I in the easterly (E) direction, part of the image I disappears outside the TS 110 of the TD 100 and this disappearing part Ib of the image I starts appearing on the TS-3 (110-3) of the TD-3 (100-3).

With continued reference to FIG. 3C, the location (A-A') on the right side of the TS 110 of the TD 100 location at which the image I starts disappearing, and the location (B-B') on the left side of the TS-3 (110-3) of the TD-3 (100-3) location at which the image I starts appearing, correspond to each other.

Accordingly, still referring to FIG. 3C, if the TD 100 and the TD-3 (100-3) are arranged side by side, the location (A-A') on the right side of the TS 110 location at which the image I disappears, faces the location (B-B') on the left side of the TS-3 (110-3) location at which the image I appears.

Accordingly, a visual effect is obtained, in which an image I disappears from the right side (i.e., the closest side of TS 110 to the TD-3) of the TS 110 of the TD 100, and appears from the left side (i.e., the closest side of the TD-3 to the TD 100) of the TS-3 (110-3) of the TD-3 (100-3).

The abovementioned visual effect is enabled mainly by the two reasons explained below.

First, the image data regarding the disappearing part of the image I on the TS 110 of the TD 100, is transferred to the TD-3 (100-3) before the corresponding image part is no longer viewable on the first display screen TD 100.

As mentioned above, the transfer of the image data begins as soon as the corresponding image I touches the imaginary frame 115 of the TS 110. Therefore, the image data is transferred before the corresponding image part disappears, and this enables the visual effect that the image directly appears on the TS-3 (110-3) of the TS-3 (100-3) upon disappearing from the TS 110 of the TD 100.

Secondly, with continued reference to FIG. 3C, the information regarding status of an image on display ('image display status information') on the TS 110 of the TD 100 is transferred to the TD-3 (100-3), as mentioned above. The image display status information from the TD 100 to the TD-3 (100-3) includes: i) information regarding a part (Ia) displayed on TS 110; ii) information regarding location of the displayed part (Ia) on the TS 110; and iii) information regarding a part (Ib) disappearing from the TS 110.

The TD-3 (100-3) is able to determine the location (A-A') at which the image I disappears, based on 'ii) information regarding location of the displayed part (Ia) on the TS 110', and compute the location (B-B') on the TS-3 (110-3) at which the image appears, based on the location (A-A').

The abovementioned visual effect is then obtained, as the TD-3 (100-3) displays 'a part (Ib) disappearing from the TS 110' at the computed location (B-B').

Figure 3D:
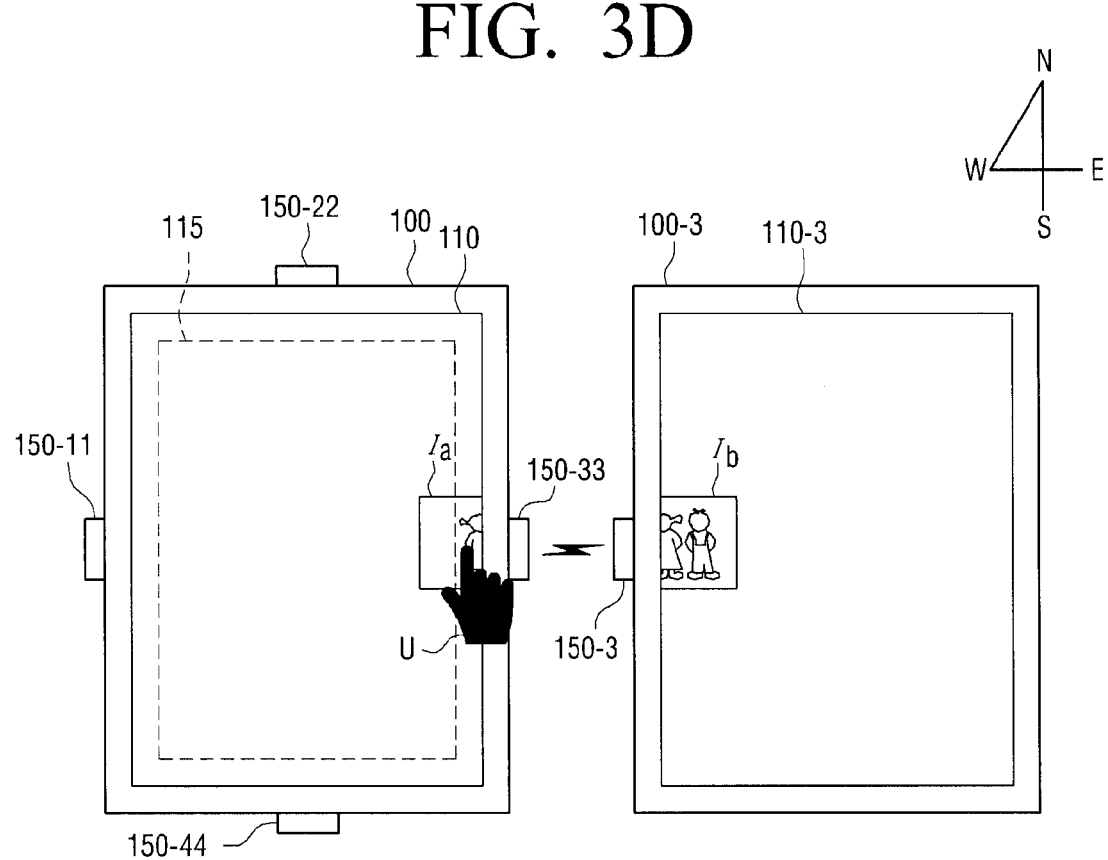

FIG. 3D illustrates a situation where the image (Ia+Ib) is moved further from the TS 110 of the TD 100 to the TS-3 (110-3) of the TD-3 (100-3), by the user's continuous dragging.

Figure 3E:
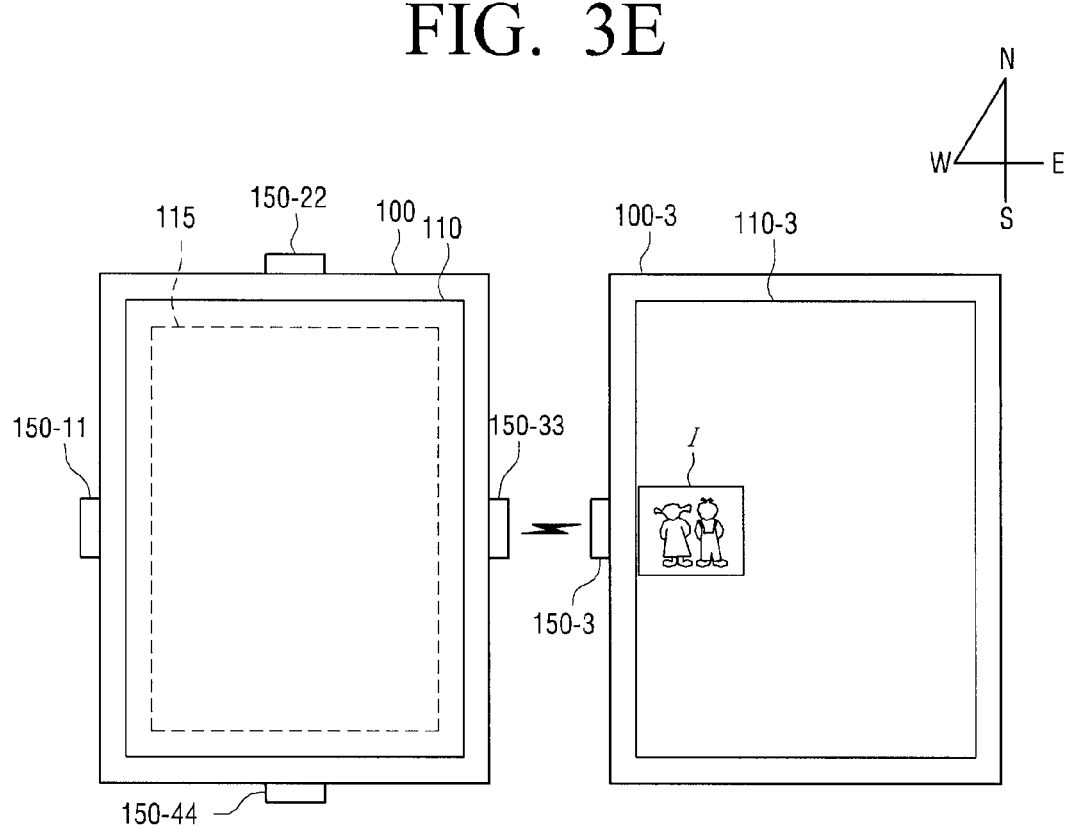

FIG. 3E illustrates a situation where the image I is completely transferred to the TS-3 (110-3) of the TD-3 (100-3).

(3) Processing the Operation of the TD 100

Figure 4:
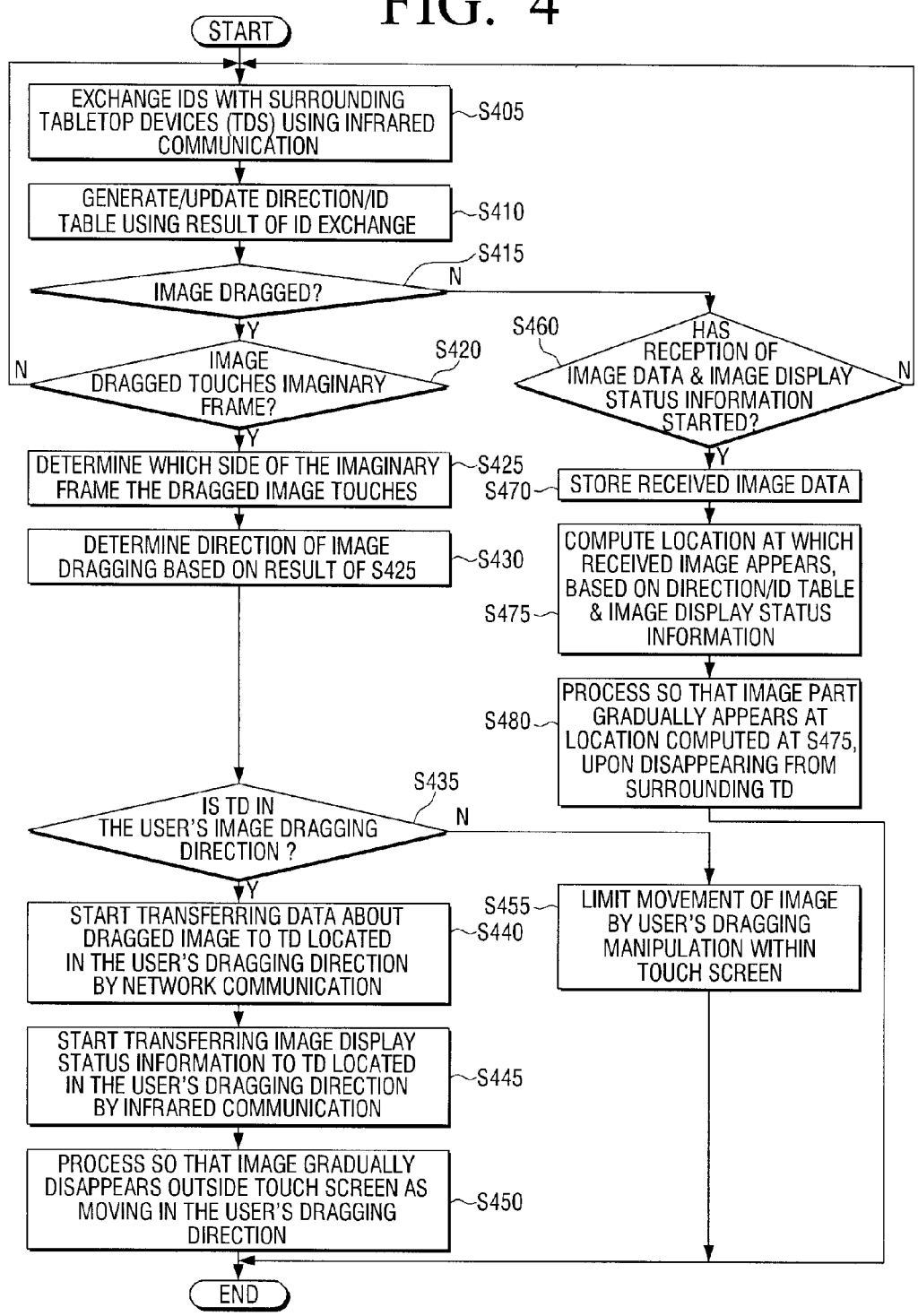
FIG. 4 is a flowchart illustrating a method for transferring an image according to an exemplary embodiment of the present invention.

The operation of the TD 100 will be explained below with reference to FIG. 4. FIG. 4 is a flowchart illustrating a method for transferring an image I according to an exemplary embodiment of the present invention.

The operations illustrated in FIG. 4 include 1) operations at S405 to S410 for preparation of image transfer/reception; 2) operations at S415 to S450 for an image transfer from TD 100 to another TD; and 3) operations at S460 to S480 for an image reception of TD 100 from another TD. The operations in 1) and 2) will be first explained herein below.

Referring now to FIG. 4, at S405, the TD 100 exchanges IDs with the surrounding TDs (100-1 to 100-4) via infrared communication. The ID exchanges by infrared communication at S405 are carried out by the ITUs (150-11 to 150-44) of the TD 100 and the ITUs (150-1 to 150-4) of the surrounding TDs (100-1 to 100-4).

At S410, the TD 100 generates a direction/ID table using the result of ID exchange at S405, and stores the generated table. The direction/ID table generated at S410 represents the information about the directions where the surrounding TDs (100-1 to 100-4) are located, as explained above.

It is then determined at S415 whether or not an image is dragged across the screen.

At S415-Y, the user drags an image, so that at S420-Y, so that the image moves into contact with the imaginary frame 115 of the TS 110, and at S425, the TD 100 determines which side of the imaginary frame 115 the dragged image touches.

At S430, the TD 100 determines a direction in which the user U drags the image I based on the determination at S425. It is possible to determine the direction to which the user U is dragging the image I based on which side of the imaginary frame 115 the image is dragged to contact. By way of example, if the image is dragged to touch the side of the imaginary frame 115 in the easterly direction, the TD 100 determines the user's dragging to be eastward.

A person of ordinary skill in the art should understand and appreciate that while the examples herein show a user's finger dragging an image, a stylus or pointing device could also be used. It is preferred, however, that a touchscreen is used to practice the invention. The "touch" can be placement of the finger sufficiently close to change the level of capacitance sensed by certain touch screens. White typically a resistive touchscreen may be preferred, the invention can be practiced with other types of touch screens, such as Capacitive, Infrared (IR), and Surface Acoustical Wave (SAW).

At S435, the TD 100 references the direction/ID table to determine if the TD is located in the user's dragging direction. The determination at S435 may include determining if the direction/ID table includes the ID of the TD located in the east (E) direction.

At S435-Y, where it determined that there is the TD located in the user's dragging direction, then at S440, the TD 100 starts transferring the data about the dragged image I to the TD located in the user's dragging direction by network communication.

At S445, the TD 100 also starts transferring the image display status information on the TS 110 to the TD located in the user's dragging direction, preferably by infrared communication.

The ITU having the infrared communication unit at S445 is the ITU-33 (150-33) which faces the TD-3 (100-3) located in the user's dragging direction.

At S450, the TD 100 processes so that the image I moves in the direction of the user's dragging and gradually disappears outside the TS 110.

At S435-Y, if determining that there is no TD located in the direction of the user's dragging, at S455, the TD 100 limits the movement of the image I by the user's dragging within the TS 110.

Since there is no TD located in the direction of the user's dragging, there is no transfer of image transfer.

The operations at S460 to S480 of the TD 100 to receive image from another TD will be explained in detail herein below.

At S460-Y, if the TD 100 starts receiving the image data and the image display status information from the surrounding TD, at S470, the TD 100 stores the received image data.

At S475, the TD 100 computes a location where the received image is to appear, based on the image display status information.

As mentioned above, the image display status information may include: i) information regarding a part (Ia) displayed on TS 110; ii) information regarding location of the displayed part (Ia) on the TS 110; and iii) information regarding a part (Ib) disappearing from the TS 110.

Accordingly, at S475, the TD 100 is able to determine a location where the image disappears from the TS of the surrounding TD, based on the 'ii) information regarding location of the displayed part on the TS', and computes a location where the image is to appear on the TS 110 thereof, based on the location where the image disappears.

At S480, the TD 100 controls the TS 110 thereof so that the image I gradually appears at the location computed at S475, upon disappearing from the surrounding TD. The TD 100 at S480 may refer to the image display status information, to find out the part of the image I disappearing from the surrounding TD.

Meanwhile, at S415-N, if a user is not dragging an image I, and at S460-N, no image is received from the surrounding TD, and the TD 100 re-performs operations at S405 and S410 to update the stored direction/ID table thereof. By re-performing the operations at steps S405 and S410, the TD 100 reflects the change in arrangement of the surrounding TDs, or change of the surrounding TDs.

(4) When a User's Dragging Direction is Unclear

Figure 5A:
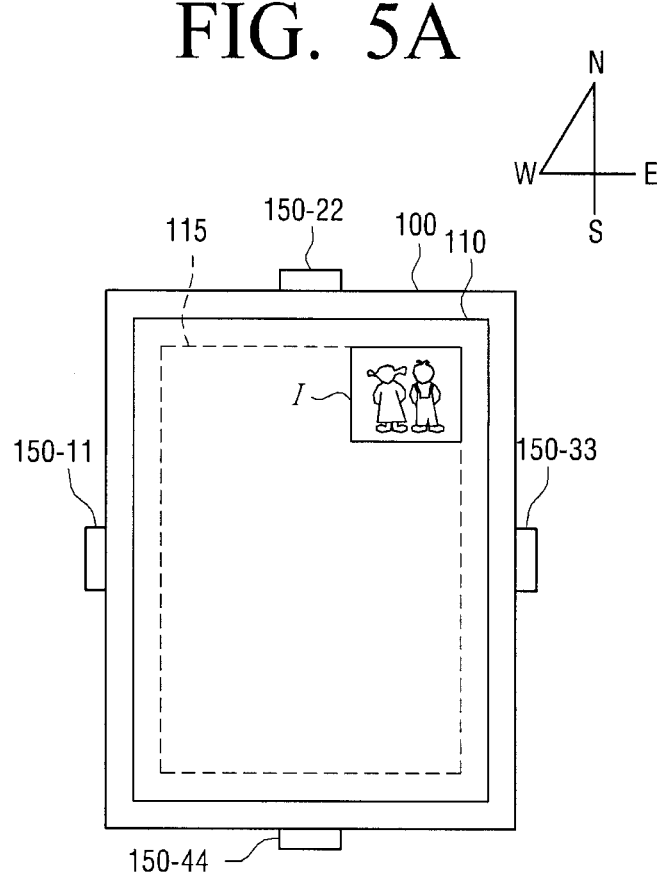
FIGS. 5A to 5C are views provided to further illustrate a situation where a direction of user dragging is unclear.

FIG. 5A illustrates an example in which the image I is contacted with two sides of the imaginary frame 115 of the TS 110 concurrently by the dragging of a user U in northeast direction. In other words, the image I in FIG. 5A touches the sides of the imaginary frame 115 in both the northerly and easterly directions.

In the example above, the TD 100 is unable to decide the direction of the user's dragging and therefore, fails to determine a target surrounding TD to transfer the image I to.

If there is only one TD located in the indicated direction, i.e., if only one TD is located either in north (N) or east (E) direction of the TD 100, the TD 100 may transfer the image I to the direction where the TD is located.

However, if TDs are located both in north (N) and east (E) directions of the TD 100, the TD 100 may, for example, display a graphic user interface (GUI) on the TS 110 to inquire the user U as to which of the TDs the user wishes to transfer the image I to, and transfer the image I to the TD as selected by the user U via the GUI.

Meanwhile, even when there is only one TD located either in north (N) or east (E) direction, to ensure that the user's intention is conveyed accurately, the TD 100 may display the GUI and indicate the direction where image transfer is possible between north (N) and east (E) directions, and request a user's confirmation that the image I is to be transferred to the TD in the indicated direction.

Figure 5B:
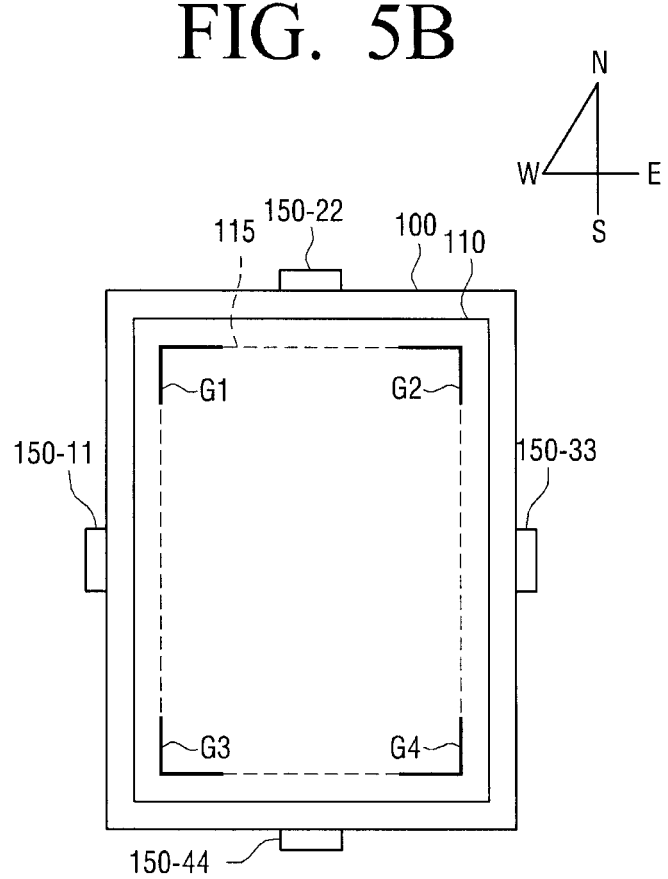

Alternatively, as illustrated in FIG. 5B, the corners of the imaginary frame 115 may be divided into guard areas (G1 to G4) to be used when the direction of dragging is unclear. That is, if the image I touches the guard areas (G1 to G4), the user U may be inquired to confirm/select which of the TDs the user U wishes to transfer the image I.

Each of the guard areas (G1 to G4) may have two sides. However, the image I does not necessarily have to touch both sides of the guard area (G1 to G4) to necessitate displaying of an inquiry to the user as to 'which of the TDs the user wishes to transfer the image?'

Figure 5C:
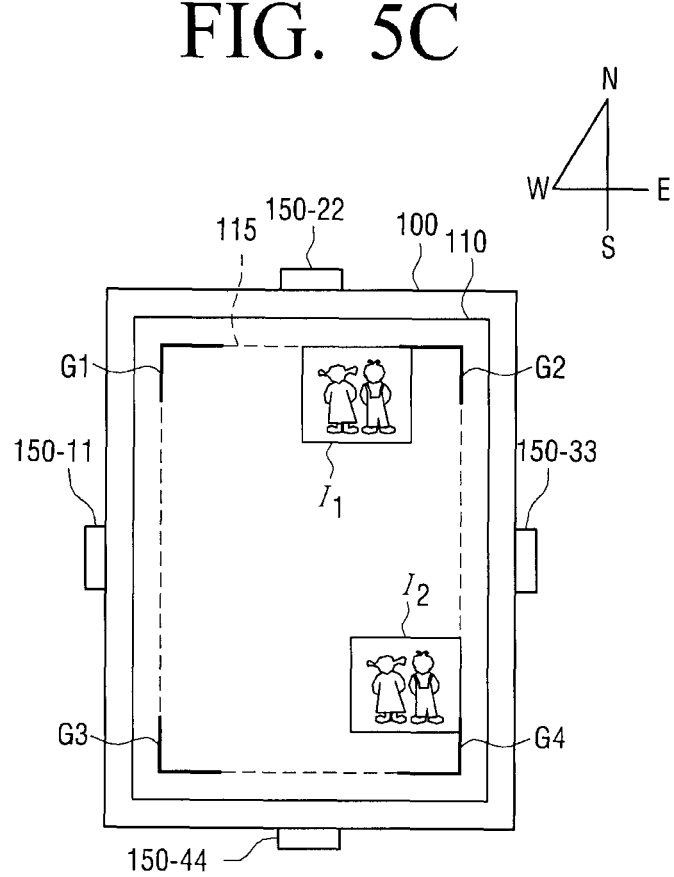

That is, referring now to FIG. 5C, the inquiry as to 'which of the TDs the user wishes to transfer the image' may be displayed, if the image (I1, I2) touches either one of the two sides of the guard area (G2, G4).

(5) When the Target TD Receiving an Image does not have a Display

Figure 6A:
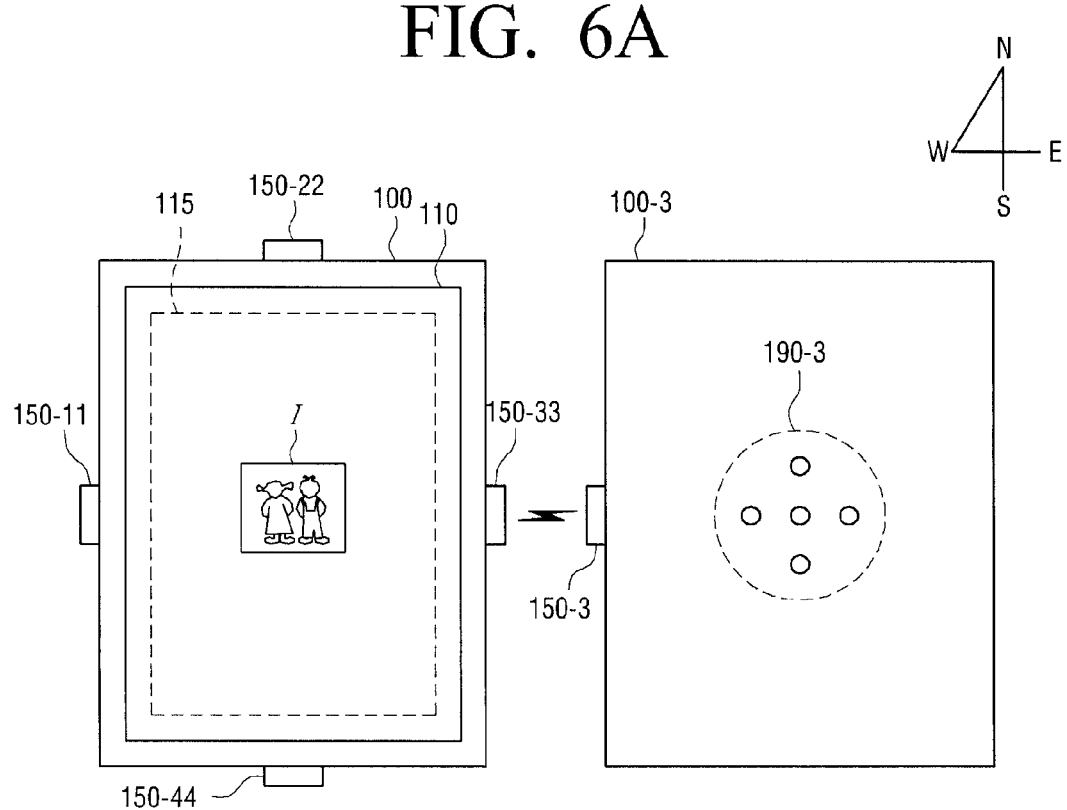
FIGS. 6A to 6C are views illustrating a situation where a target receiving tabletop device has no display provided therein.

In the example illustrated in FIG. 6A, the target TD-3 (100-3) to receive an image I does not have a display such as touch screen, but instead includes a light emitting diode (LED) module 190-3.

As illustrated in FIG. 6A, there are five LEDs provided, one each the east, west, south, and north directions, and one at a center of the LED module 190-3, to indicate a certain direction according to an order the LEDs are illuminated. By way of example, the illuminating order of 'north LED ON→center LED ON→south LED ON' of the LED module (190-3) indicates a south direction, and order of 'east LED ON→center LED ON→west LED ON' of the LED module (190-3) indicates a west direction.

The operation of the TD 100 is similar to that explained above, except the difference that the TD 100 in the present exemplary embodiment does not transfer image display status information on the TS 110 to the TD-3 (100-3).

Meanwhile, the TD-3 (100-3) controls the order of illuminating of the LED module (190-3) based on the result of image transfer, and more specifically, the TD-3 (100-3) controls the order of illuminating of the LED module (190-3) to indicate the direction of image transfer.

Accordingly, the TD-3 (100-3) determines the direction in which the transmitting TD 100 is located, because this is the opposite direction to a direction to which the image I is transferred. It is possible to analyze the transmitting TD 100 by extracting ID_#0 of the TD 100 from the header of the transferred image, and finding out a direction which corresponds to the extracted ID by referring to the direction/ID table.

Referring again to FIG. 6A, since the TD 100 as the transmitting side is located in a west direction of the TD-3 (100-3), the east direction, which is opposite to the west direction, corresponds to the direction to which the image is transferred.

Figure 6B:
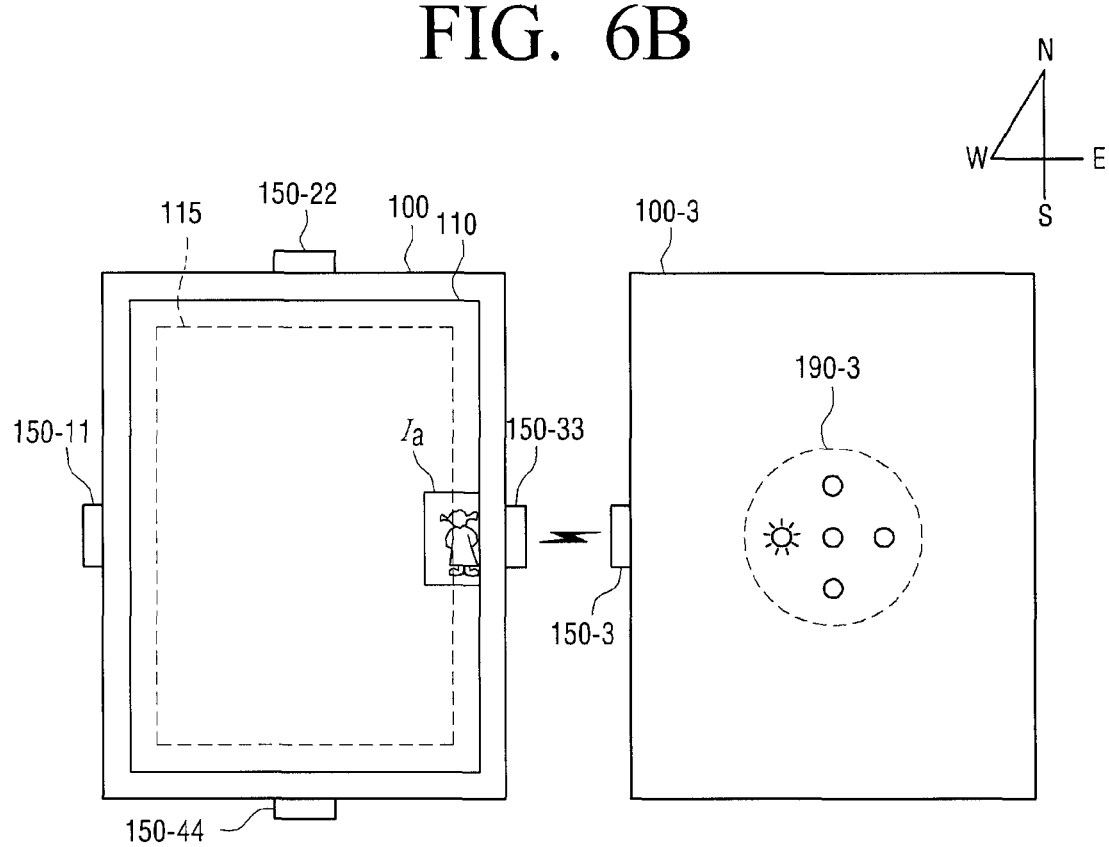
Figure 6C:
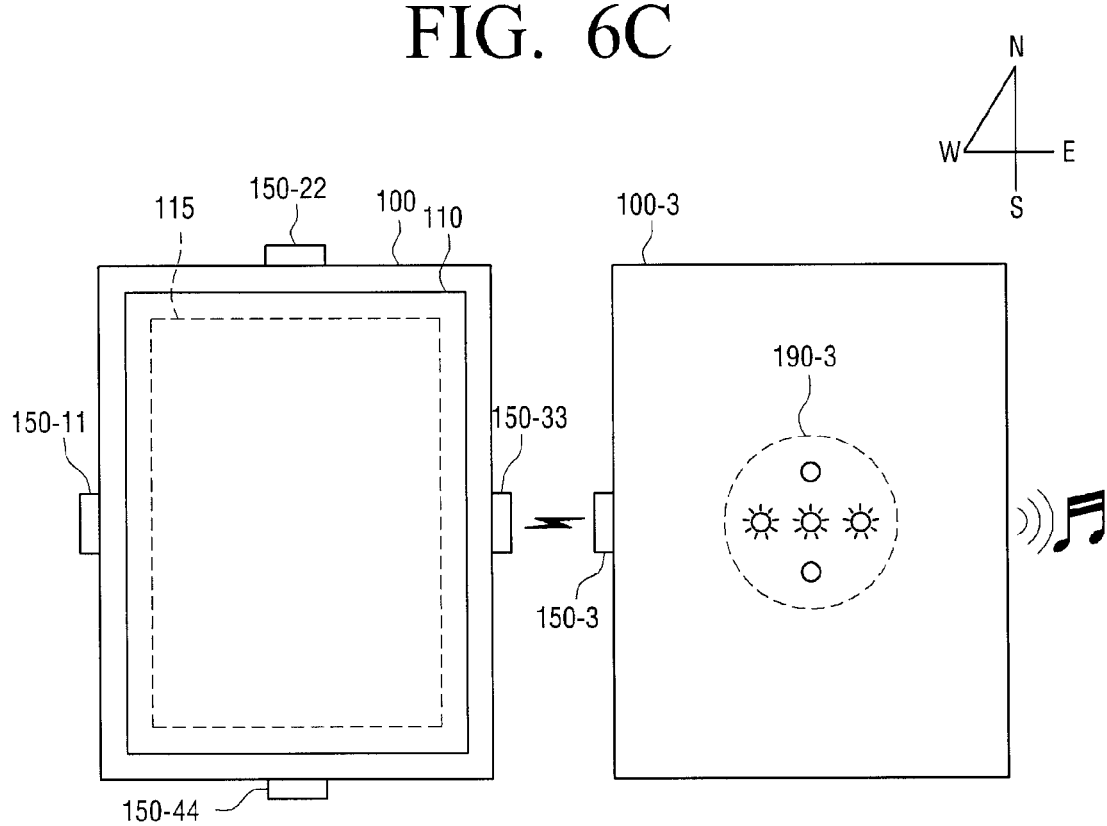
Figure 7A:
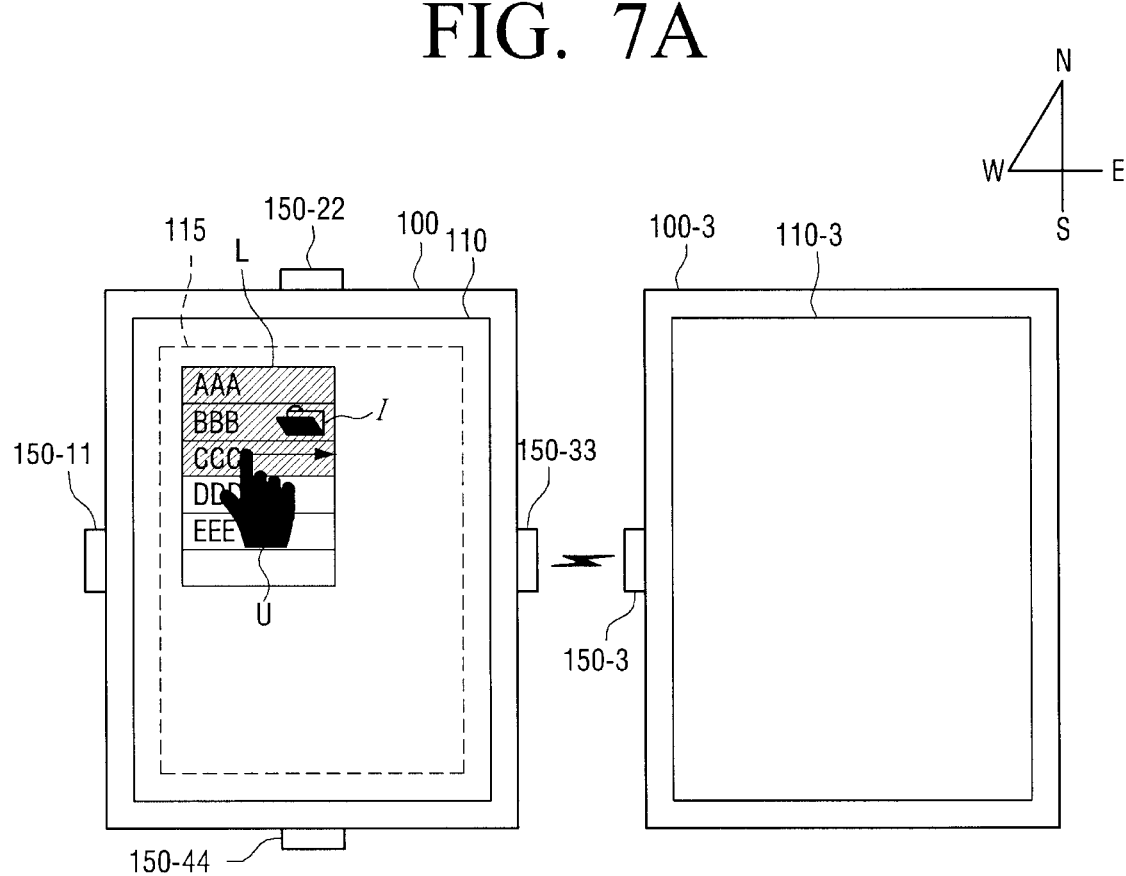
FIGS. 7A to 7D are views illustrating a process in which a plurality of files selected by a user from a file list are dragged in bundle and transferred as a bundle.
Figure 7B:
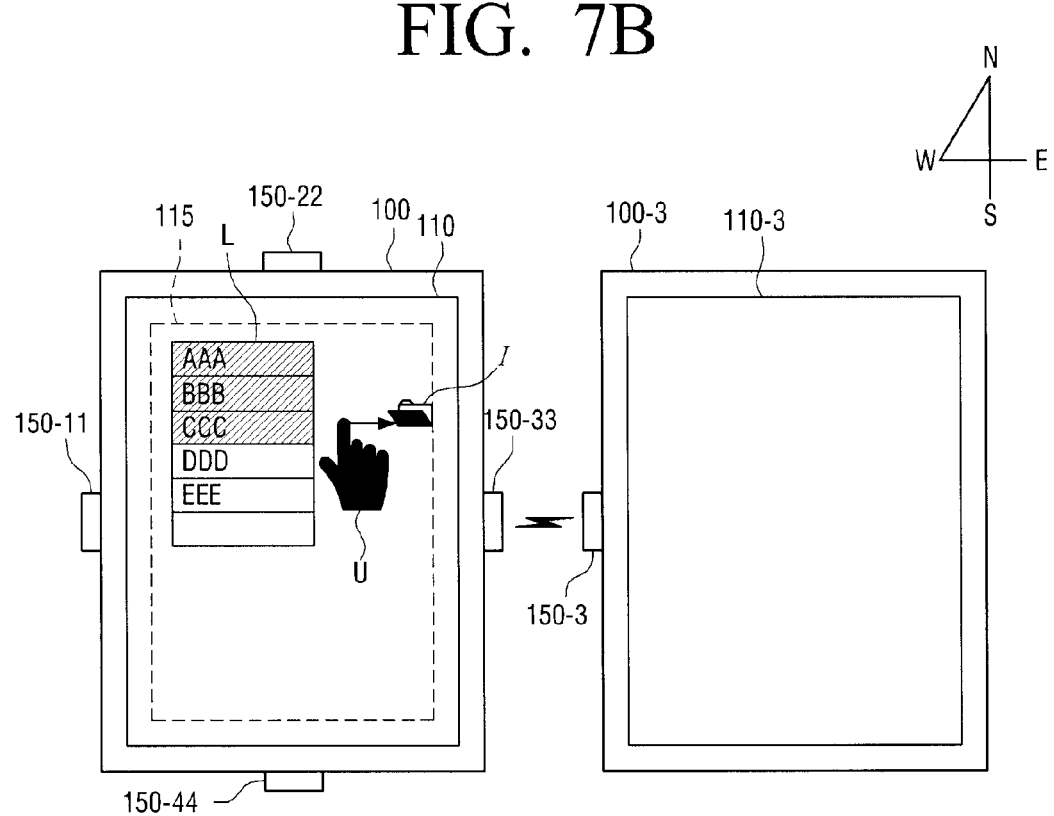
Figure 7C:
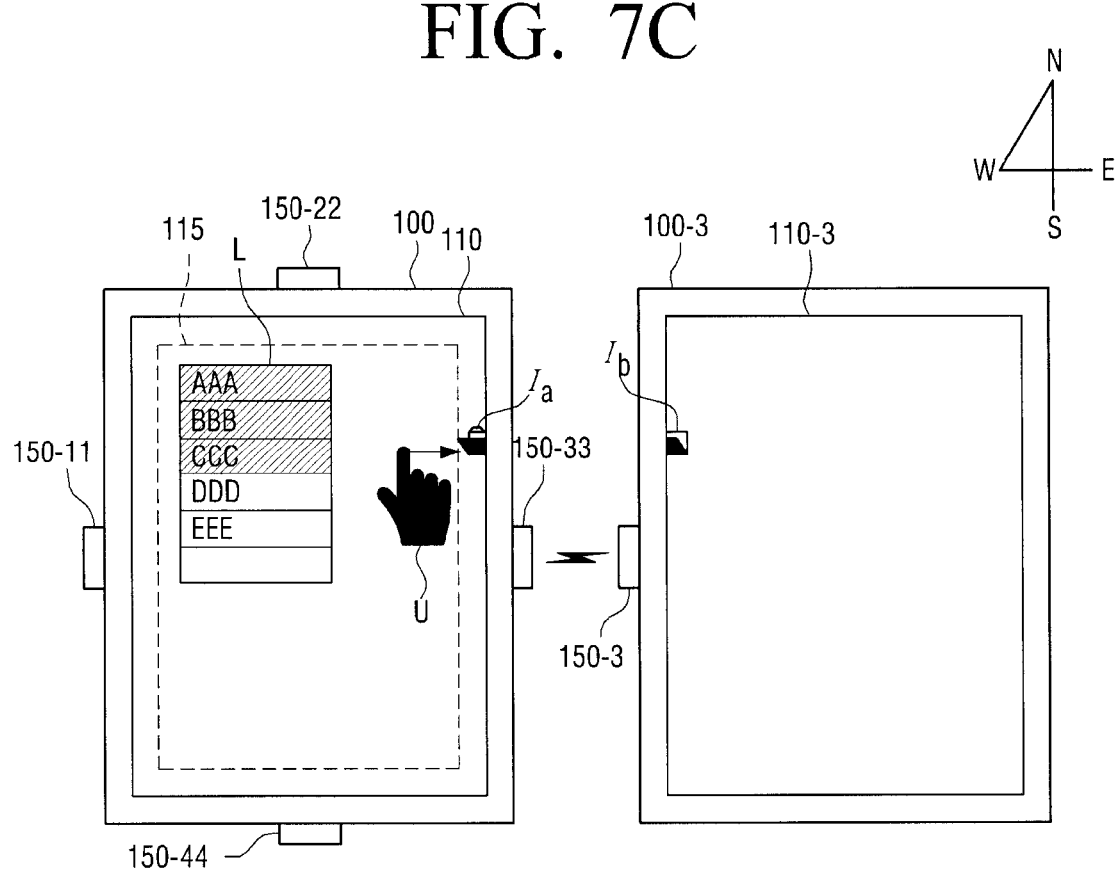
Figure 7D:
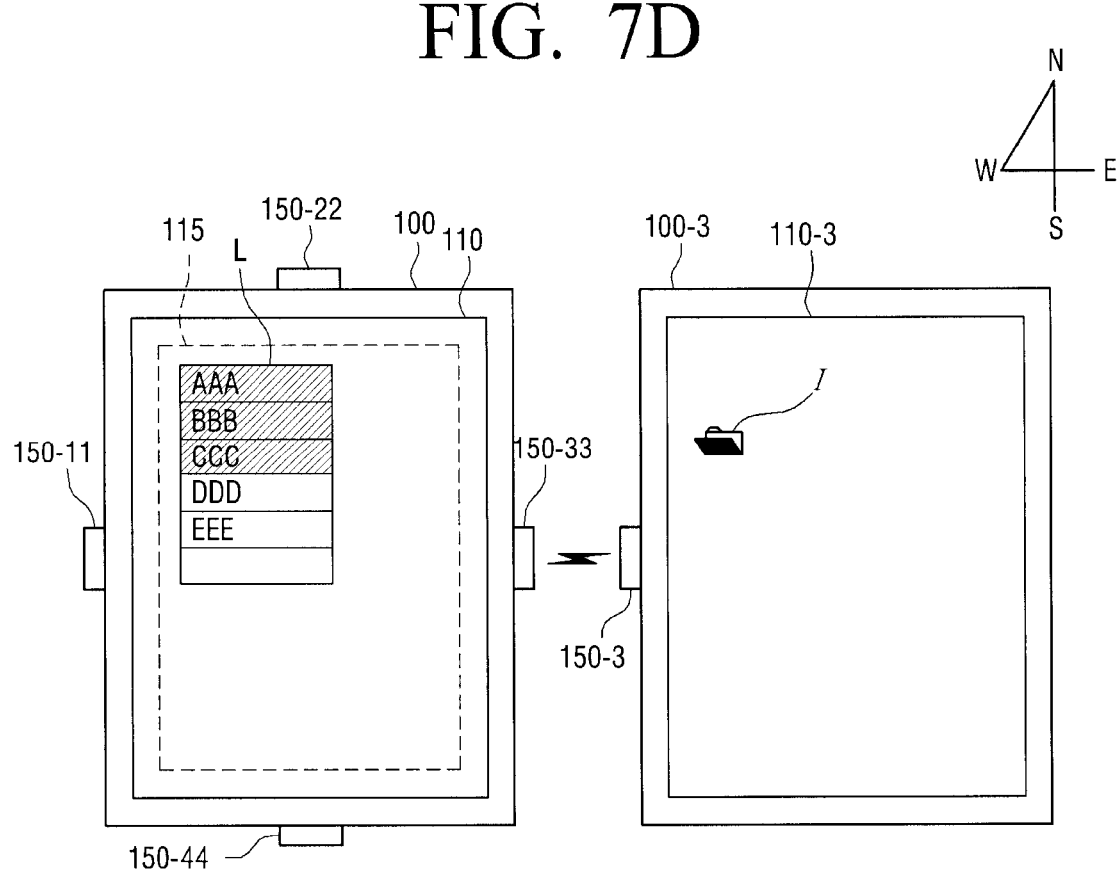

Accordingly, the TD-3 (100-3) controls the order of illuminating the LED module 190-3 to indicate the east direction as the direction to which the image I is transferred, as illustrated in FIGS. 6B and 6C.

Referring now to FIGS. 6B and 6C, according to the result of image transfer, the LED module 190-3 is controlled to illuminate in the order of 'west LED ON→center LED ON→east LED ON' to thereby visibly indicate the east (E) direction as the direction to which the image is transferred (from the TD 100 located in the west).

Referring also to FIG. 6C, the TD-3 (100-3) may output sound (♪) as the image transfer is completed, but this feature is optional and may be omitted.

It is also possible to output one sound (♪) during image transfer, and possibly output another sound having a different tune from that of the one sound, (♪), which is output upon completion of the image transfer.

Only the sound (♪) may be employed to indicate the user of the completion of the image transfer, if the receiving TD-3 (100-3) does not have a LED module 190-3 therein as shown in the example.

Alternatively, a multi-color LED may be employed to indicate the user of the status of image transfer with varying colors, as well as the direction.

(6) When Files are Transferred in a Bundle

FIGS. 7A to 7D illustrate a process in which a plurality of files (AAA, BBB, CCC) selected by the user U from the file list L are dragged in bundles and transferred from the TD 100 to the TD-3 (190-3).

In the process exemplified in FIGS. 7A to 7D, an icon I, instead of the bundles of files, appears on the TS-3 (110-3) of the TD-3 (100-3) upon disappearing from the TS 110 of the TD 100.

Accordingly, the files shown may be transferred from the TD 100 to the TD-3 (100-3) by a network communication due to their size, while 'data about icon image' and 'information about icon status on TS 110' are transferred from the TD 100 to the TD-3 (100-3) by infrared communication.

The 'data about icon image' is of small size so that it is transmitted fast enough by infrared communication.

(7) Other Variations

Regarding Infrared Transceiving Units (ITUs)

In the exemplary embodiments described herein above, the ITUs (150-1 to 150-4, and 150-11 to 150-44) provided on the sides of the TDs (100, 100-1, 100-2, 100-3, 100-4) are used as the means to determine directions at which surrounding TDs are located.

Since the infrared communication is directivity-based communication, the infrared communication may be replaced by other types of directivity-based communication means.

By way of example, the ITU may be replaced by: 1) directivity-based speaker & microphone; 2) directivity-based ultrasonic transceiving unit; and 3) directivity-based RF transceiving unit. The above replacements are equally able to transfer IDs while facing counterpart devices.

Alternatively, if a TD facing a surrounding TD has the highest level of signal reception from the surrounding TD, the TD may have a weaker directivity, or no directivity, and may still be able to determine the directions at which the surrounding TDs are located.

Alternatively, a wireless network communication module may be applied to determine the directions at which the surrounding TDs are located. By way of example, it is possible to determine the directions at which the surrounding TDs are located, by using communication between the neighboring ones of the surrounding TDs using WiFi module.

It is also possible to exchange IDs between the TDs using network communication. In this case, an ITU of the TD requests an ID to the surrounding TDs in sequence, and the TD transfers its own ID over the network in return upon receiving the ID request.

In the above example, if the ITU-11 (150-11) of the TD 100 requests for an ID by infrared communication, the ITU-1 (150-1) of the TD-1 (100-1) in receipt of the ID request transfers its own ID_#1 over the network. Accordingly, the TD 100, in receipt of ID_#1 over the network, determines that the TD (which is located in the westerly (W) direction) facing the ITU-11 (150-11) is the TD-1 (100-1) with the ID_#1.

Although it is exemplified above that the TDs exchange IDs, information other than ID, such as S/N of the TDs, or network address, may be applied.

Manual Setting of Directions at which Surrounding TDs are Located

In the exemplary embodiments explained above, the TDs determine the directions at which the surrounding TDs are located automatically, using means such as ITUs. However, this determination of directions is only provided for illustrative purpose, and other examples are possible.

For example, the directions at which surrounding TDs are located may be determined by manual input of the user. In this case, the user may be required to input manually: 1) directions at which surrounding TDs are located; and 2) IDs of the surrounding TDs.

The direction/ID table as the one illustrated in FIG. 2 may be generated based on the user input.

Regarding Image Data Transfer

In the exemplary embodiments explained above, the image I disappears from the TS 110 and appears on the TS-3 (110-3) only when the user U keeps dragging the image I after the image I touches the imaginary frame 115. However, this operation is only provided for illustrative purpose, and other examples are also possible.

For example, the image I may automatically disappears from the TS 110 and appears on the TS 110-3 without requiring continuous dragging of the user, once the image I is contacted with the imaginary frame 115 by the user's dragging manipulation.

Furthermore, although the 'location on the transmitting TD location at which the image disappears' faces the 'location on the receiving TD location at which the image appears' in the exemplary embodiments explained above, this is only for illustration purposes and other examples are also possible.

Accordingly, the 'location on the transmitting TD location at which the image disappears' may not necessarily face the 'location on the receiving TD location at which the image appears'.

Figure 8A:
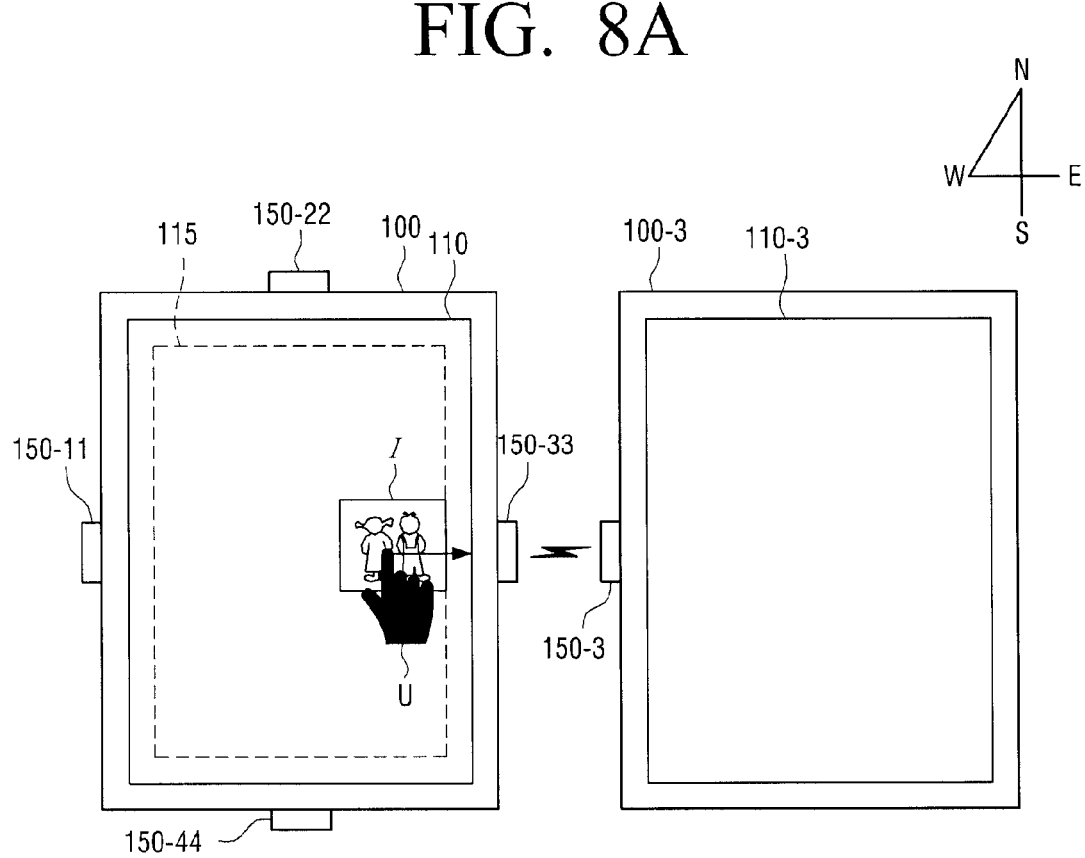
FIGS. 8A and 8B are view illustrating a process in which an image is transferred to a specific location on a second tabletop device.
Figure 8B:
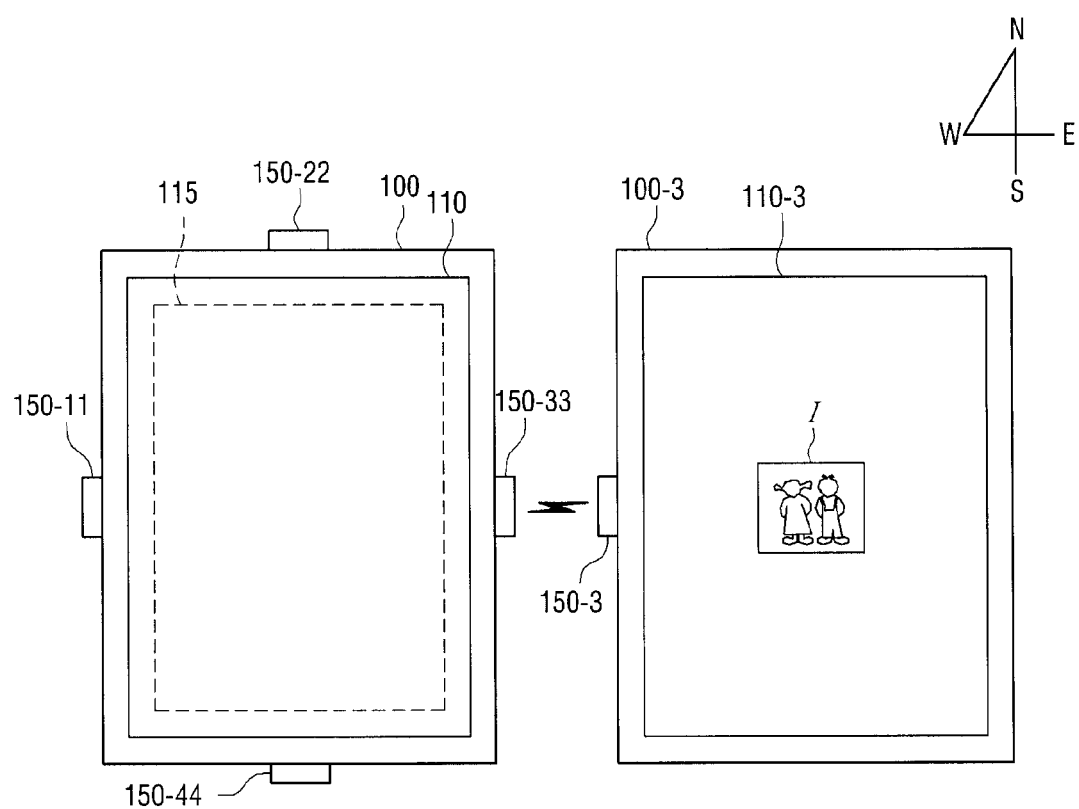

By way of example, referring to FIGS. 8A and 8B, the image I may appear on the center of the TS-3 (110-3) of the TD-3 (100-3), upon disappearing from the right side (i.e., the closest side to the TD-3 (100-3)) on the TS 110 of the TD 100.

Herein, the location at which the image I appears, is not required to be the center of the TS-3 (110-3). By way of example, the image I received from the TD 100 may appear from the locations other than the center on the TS-3 (110-3) of the TD-3 (100-3), such as upper, lower, left or right side.

Furthermore, the image I transfer may be executed depending on the speed of the user's dragging manipulation. By way of example, the image I may be transferred in the direction of the user's dragging, if the image I is yet to touch the imaginary frame 115, but the user's dragging manipulation is fast enough to exceed a threshold speed (for example, if the user U has flick manipulation on the image I).

Alternatively, the process in which the image I disappears from one TS 110 and appears on other TS 110-3 may be executed after completion of image data transfer. In this example, the image I may stay in the TS 110, instead of disappearing, until image data transfer is completed.

Herein, the 'image transfer' includes the concept of image copy. In the case of an 'image copy', the TD 100 may still possess the image data even after the image I disappears from the TS 110 and image data is transferred to the TD-3 (100-3).

Furthermore, the user's manipulation to transfer an image I may take other forms than dragging across the TS. For example, a dragging manipulation using a mouse or other pointing device (such as a laser pointer) is applicable.

In the exemplary embodiments explained above, a target TD is determined among the surrounding TDs, based on a direction to which an image is dragged. However, this example is provided only for illustrative purposes, and other examples are also possible.

Figure 9:
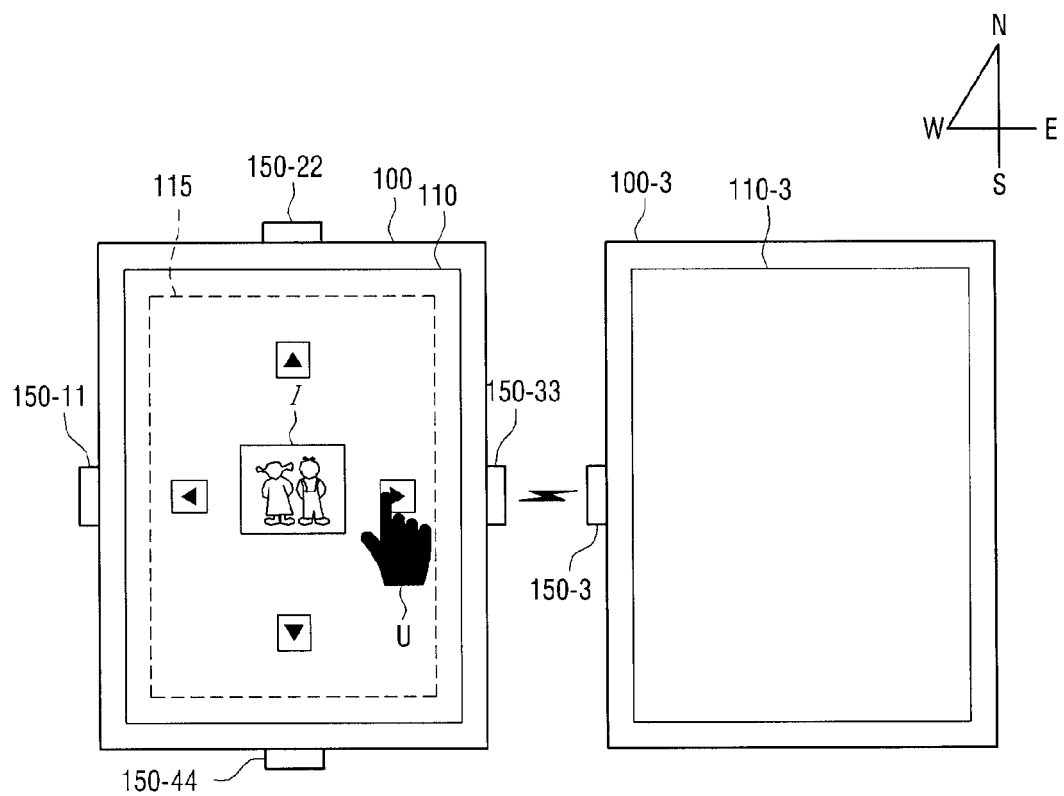
FIG. 9 is a view illustrating a process in which an image is transferred to a second tabletop device according to a direction input manipulated by a user.

By way of example, referring to FIG. 9, direction-selecting items (▲, ▼, ◄, ►) may be indicated around the image I on the TS 110 of the TD 100, so that the user U inputs a desired direction and the image I is transferred to the surrounding TD at a direction as input by the user U.

Although FIG. 9 illustrates an example where the direction-selecting items (▲, ▼, ◄, ►) are provided by the GUI on the TS 110, other examples are also possible. For example, physical buttons may replace the above-mentioned GUI items.

Regarding Image Display Status Information

In the exemplary embodiments explained above, the image display status information preferably includes: 1) information about a part (Ia) displayed on the TS 110; 2) information about a location of the displayed part on the TS 110; and 3) information about a part (Ib) disappearing from the TS 110. However, these items are provided only for illustrative purposes, and other examples are also possible.

Other forms of information may replace the specific information type explained above, provided that the replacing information is used as the image display status information to indicate which part of the image I disappears location at which location on the TS 110 of the TD 100.

Furthermore, although the image display status information is transferred by infrared communication in the exemplary embodiments explained above, other examples are also possible. For example, the image display status information may be transferred by network communication, or by VLC, as two possible examples.

Subject of Transfer

Although the image I or files are transferred in the exemplary embodiments of the present invention, this action is provided only for illustrative purposes, and other examples are also possible. Accordingly, the concept of the present invention is equally applicable to a situation where content other than image or file form is transferred.

The term 'content' herein refers to a concept that encompasses various types of graphics displayable on a touch screen. For example, the content may include text, video, flash image, icon, window on which application is executed, or texts, images, shapes or marks handwritten by the user, or the like.

The texts, images, shapes or marks handwritten by the user may be generated, for example, as an image file or graphic information (shapes, vectors, colors). Accordingly, if it is necessary to transfer the texts, images, shapes or marks handwritten by the user, the content may be transferred by image file or graphic data transfer, in which the latter example is more beneficial in terms of reduced data rate to transfer.

Device Applicable to Present Invention

Although the content transfer among TDs is explained above in the exemplary embodiments of the presently claimed invention, other types of devices may be equally applied. By way of example, not only portable devices such as mobile phones, MP3 players, digital cameras, digital camcorders, or portable PCs, but also stationary devices such as electronic frames, IP-TVs, desktop PCs, or electronic boards may be applicable according to the presently claimed invention.

Furthermore, the network may not necessarily have homogeneous types of devices. Instead, the device types of the network may be heterogeneous. For example, a TD and a mobile phone may be adapted to transfer the content according to an exemplary embodiment of the present invention.

Figure 10:
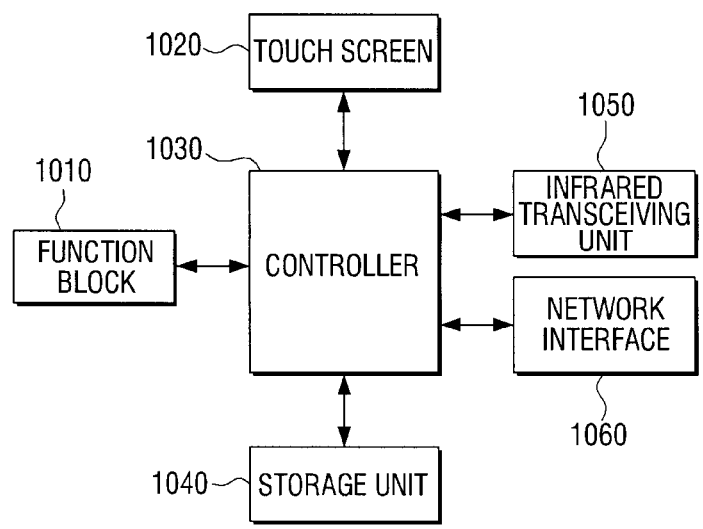
FIG. 10 is an exemplary block diagram of a device applicable according to an exemplary embodiment of the present invention.

FIG. 10 is a block diagram of a device applicable according to an exemplary embodiment of the present invention. Referring now to FIG. 10, the device may include a function block 1010, a touch screen (TS) 1020, a controller 1030, a storage unit 1040, an infrared transceiving unit (ITU) 1050, and a network interface 1060.

The function block 1010 performs the function of the device. That is, the function block 1010 of a tabletop device (TD) may perform a function required for a digital meeting, and the function block 1010 of a mobile phone may perform a function of the mobile phone.

The TS 1020 performs a function of a user interface to provide a display on which content is presented and disappears, and also to receive user commands such as touch, drag, or the like.

The storage unit 1040 stores the content displayed on the TS 1020, or the content transferred or received to or from the other device.

The ITU 1050 performs infrared communication which is explained above, and the network interface 1060 performs network communication which is also explained above.

The controller 1030 carries out a flow of operations illustrated in FIG. 4 to achieve content transfer or reception among the devices.

As explained above, according to the exemplary embodiments of the present invention, since the user U is able to transfer content to a surrounding device located at a corresponding direction by moving the content on a display, the user U can select a device to receive the content more easily and intuitively. Additionally, the user U can both select the device to receive the content and input a command to transfer the content by one single manipulation.

Furthermore, since the direction in which the content is received from a transmitting surrounding device is visibly indicated, the user U intuitively knows from which device the content is received. The above-described methods according to the present invention can be realized in hardware or as software or computer code that can be stored in a recording medium such as a CD ROM, a RAM, thumbnail drive, a floppy disk, a flash storage, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The foregoing exemplary embodiments and advantages are merely exemplary and are not to be construed as limiting the present invention. The present teaching can be readily applied to other types of apparatuses and methods. Also, the description of the exemplary embodiments of the present invention is intended to be illustrative, and not to limit the scope of the claims, and many alternatives, modifications, and variations will be apparent to those skilled in the art.

What is claimed is:

1. A method for transferring content in a touch device, the method comprising:
    determining respective locations of one or more external devices;
    receiving a touch input to an object on a display of the touch device, wherein the object represents the content stored in the touch device;
    determining a direction with respect to the object which is moved by the touch input and contacts a non-visible border provided along all sides of a perimeter inside of the display;
    determining at least one or more external devices located in the determined direction among one or more external devices; and
    wirelessly transferring the content represented by the object directly to the at least one external device located in a determined direction of movement of the object,
    wherein determining the direction to which the object is moved comprises, when the content is moved and contacts the non-visible border, determining the direction to which the content is moved based on a side of the non-visible border that the object makes contact with.

2. The method of claim 1, wherein determining the respective locations comprises receiving information about the one or more external devices via different sides of a particular device, and determining respective directions in which the one or more external devices are located.

3. The method of claim 2, wherein the determining the respective locations comprises:
    determining a first external device of the one or more external devices, which transfers its own information via a first side of the particular device, to be located in a first direction; and
    determining a second external device of the one or more external devices, which transfers its own information via a second side of the particular device, to be located in a second direction.

4. The method of claim 2, wherein the information of the one or more external devices are received via different sides of a particular external device by at least one of infrared communication, sound wave communication, ultrasonic communication, RF communication, wireless network communication, or WiFi communication.

5. The method of claim 1, wherein determining the respective locations comprises determining respective directions in which the one or more external devices are located is based upon input information about the external devices.

6. The method of claim 1, further comprising:
    re-determining the respective locations of the one or more external devices previously determined; and
    updating touch directions of the external devices based on a result of re-determining the respective locations of the one or more external devices.

7. The method of claim 1, wherein the determining the direction to which the object is moved comprises determining a designated direction to which the content is to be transferred, based on a particular direction in which the content is moved on the display, and
    wherein the transferring comprises transferring the content from a particular device to one external device of the one or more external devices located in the particular direction to which the content is moved.

8. The method of claim 7, wherein transferring the content starts by transferring the content to the external device, before the at least one of the content or an icon representing the content touches the edge of the display.

9. The method of claim 7, wherein the content is moved on the display by at least one of dragging and flick manipulations on the display.

10. The method of claim 1, wherein determining the direction to which the object is moved comprises determining a particular direction to move the content to, based on a detected input.

11. The method of claim 10, wherein determining the direction to which the object is moved comprises determining the particular direction based on the detected input utilizing one of: a direction selecting item indicated on the display; and a physical direction selecting button.

12. The method of claim 1, further comprising visibly indicating that the content or an icon representing the content is transferred to a particular direction in which one external device of the one or more external devices is located.

13. The method of claim 12, wherein the visibly indicating comprises moving at least one of the content or the icon representing the content to the particular direction in which one external device of the one or more external devices is located so that one of the content and the icon representing the content disappears outside the display of a particular device.

14. The method of claim 13, wherein a side of the display of the particular device, from which the at least one of the content or the icon representing the content disappears, is located at a closest side to the one external device of the one or more external devices.

15. The method of claim 13, wherein the at least one of the content or the icon representing the content disappearing from the display of the particular device appears on a display of the one external device of said one or more external devices, and
    a location at which the at least one of the content or the icon representing the content disappears from the display of the particular device faces a location at which the at least one of the content and the icon representing the content appears on the display of the one external device.

16. The method of claim 12, wherein the visibly indicating comprises moving the content to the particular direction in which the one external device is located until the content disappears outside the display of a particular device, and
    transferring the content comprises starting transferring of a part of the content which will disappear outside the display, to the one external device of the one or more external devices.

17. The method of claim 16, further comprising transferring information about a display status of the content on the display to the one external device, and the one external device refers to the information about the display status of the content in displaying the part disappearing from the device.

18. A method for transferring content in a touch device, the method comprising:
determining respective locations of one or more external devices;
receiving a touch input to an object on a display of the touch device, wherein the object represents the content stored in the touch device;
determining a direction with respect to the object which is moved by the touch input and contacts an edge of the display;
determining at least one or more external devices located in the determined direction among one or more external devices; and
wirelessly transferring the content represented by the object to the at east one external device located in the determined direction,
wherein the determining the direction to which the object is moved comprises determining a designated direction to which the content is to be transferred, based on a particular direction in which the content is moved on the display,
wherein the transferring comprises transferring the content from a particular device to one external device of the one or more external devices located in the particular direction to which the content is moved, and
wherein determining the direction to which the object is moved comprises, when the content is moved and contacts a non-visible border provided along all sides of a perimeter inside the display of the particular device, for determining the particular direction in which the content is moved based on side of the non-visible border that the content makes contact with.

19. The method of claim 18, wherein determining the direction to which the object is moved comprises determining that the content is moved in the particular direction comprising a first particular direction when the content makes contact with a first side of the non-visible border, and determining that the content is moved in a second particular direction when the content makes contact with a second side of the non-visible border.

20. The method of claim 18, wherein, when the content is moved to make contact with two sides of the non-visible border, each of the two contacted sides representing the particular direction on a display of two particular directions in which the content has been moved and there is the one external device located only in one of the two particular directions, the determining the direction to which the object is moved comprises determining the one of the two particular directions to be designated as the particular designated direction to which the content is to be transferred.

21. A method for receiving content in a receiving device, the method comprising:
determining locations in which one or more external devices are located and for determining directions relative from the receiving device to each of the one or more external devices;
receiving by the receiving device the content from one of the external devices; and
visibly indicating, by the receiving device that the content is received by the receiving device from a direction in which the external device transmitting the content is located,
wherein the external device transmits the content represented by an object directly to the receiving device located in a direction with respect to a movement of the object which is moved by a touch input and contacts a non-visible border provided along all sides of a perimeter inside of a display of the external device by the touch input, and
wherein the external device determines a direction to which to object is moved by, when the content is moved and contacts the non-visible border, determining the direction to which the content is moved based on a side of the non-visible border that the object makes contact with.

22. The method of claim 21, wherein the visibly indicating comprises displaying the content by the receiving device such that the content appears from a side proximal to the external device transmitting the content, among the sides of a display of the receiving device.

23. The method of claim 21, wherein the visibly indicating comprises displaying the content by the receiving device such that the content appears at a predetermined location on a display of the receiving device.

24. The method of claim 21, wherein the visibly indicating comprises computing a location on a side of the receiving device proximal to the external device and at which the content starts appearing, using information about display status of the content received from the external device transmitting the content, and displaying so that the content appears at the computed location.

25. The method of claim 21, wherein the visibly indicating comprises visibly indicating by the receiving device that the content is received from the direction in which the external device transmitting the content is located, by controlling an order of illuminating light emitting diodes of the receiving device.

26. A device for transferring or receiving content comprising:
a network interface configured to connect wirelessly to one or more external devices located by a network;
a memory that stores a content;
a touch screen display that outputs a display of an object that represents the stored content and receives a touch input to the displayed object; and
a processor configured to:
determine a touch direction with respect to the object which is moved by the touch input and contacts a non-visible border provided along all side of a perimeter inside of the touch screen display,
determine at least one external device located in the touch direction among the one or more external devices, and
wirelessly transfer the content represented by the object moved by the touch input directly to said at least one external device located in the touch direction indicating movement of the object via the network interface,
wherein determining the direction to which the object is moved comprises, when the content is moved and contacts the non-visible border, determining the direction to which the content is moved based on a side of the non-visible border that the object makes contact with.

27. The device of claim 26, wherein the network is a WiFi network.

* * * * *